US012731270B2

(12) United States Patent
Chuang et al.

(10) Patent No.: US 12,731,270 B2
(45) Date of Patent: Sep. 8, 2026

(54) HIGH DYNAMIC RANGE SCENE CUT DETECTION

(71) Applicant: QUALCOMM Incorporated, San Diego, CA (US)

(72) Inventors: Shang-Chih Chuang, San Diego, CA (US); Zhongshan Wang, Shenzhen (CN); Yi-Chun Lu, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 339 days.

(21) Appl. No.: 18/553,496

(22) PCT Filed: Sep. 15, 2021

(86) PCT No.: PCT/CN2021/118412
§ 371 (c)(1),
(2) Date: Sep. 29, 2023

(87) PCT Pub. No.: WO2022/247066
PCT Pub. Date: Dec. 1, 2022

(65) Prior Publication Data
US 2024/0037764 A1 Feb. 1, 2024

Related U.S. Application Data

(60) Provisional application No. 63/191,991, filed on May 22, 2021.

(51) Int. Cl.
*G06T 7/254* (2017.01)
*G06T 5/40* (2006.01)
*G06T 5/50* (2006.01)

(52) U.S. Cl.
CPC ................ *G06T 7/254* (2017.01); *G06T 5/40* (2013.01); *G06T 5/50* (2013.01); *G06T 2207/20224* (2013.01)

(58) Field of Classification Search
CPC .. G06T 7/254; G06T 5/40; G06T 5/50; G06T 2207/20224
See application file for complete search history.

(56) References Cited

U.S. PATENT DOCUMENTS 11,805,328 B2 * 10/2023 Duran .................... H04N 7/183
2018/0176439 A1 6/2018 Thumpudi et al.
2018/0341813 A1 * 11/2018 Chen ...................... G06V 20/46

FOREIGN PATENT DOCUMENTS

CN 105469375 A 4/2016
CN 108804980 A 11/2018
(Continued)

OTHER PUBLICATIONS

NPL: Results Publication Date Range: May 9, 2003 to May 1, 2025.*

(Continued)

*Primary Examiner* — Quang N Vo
(74) *Attorney, Agent, or Firm* — Polsinelli

(57) ABSTRACT

Systems and techniques are described herein for processing video data. In some examples, a process is described that can include obtaining a plurality of frames, determining a scene cut in the plurality of frames, and determining a smoothed histogram based on the determined scene cut. For instance, the process can include determining a first characteristic of at least a first frame of the plurality of frames and a second characteristic of at least a second frame of the plurality of frames, determining whether a difference between the first characteristic and the second characteristic is greater than a threshold difference, and determining the scene cut based a determination that the difference between the first characteristic and the second characteristic is greater than the threshold difference.

30 Claims, 15 Drawing Sheets

(56) References Cited

FOREIGN PATENT DOCUMENTS

| | | | | | |
|---|---|---|---|---|---|
| CN | 112165621 A | | 1/2021 | | |
| CN | 113034384 A | * | 6/2021 | ........... | G06F 18/214 |
| WO | 2021042909 A1 | | 3/2021 | | |

OTHER PUBLICATIONS

NPL: InnovationQ+ by IP.com and IEEE: Results Publication Date Range: May 9, 2003 to Dec. 12, 2025.*

International Search Report and Written Opinion—PCT/CN2021/118412—ISA/EPO—Feb. 10, 2022.

* cited by examiner

Luminance Range 100

Example1

Stable scene

Example2

Scene change

HIGH DYNAMIC RANGE SCENE CUT DETECTION

CROSS-REFERENCE TO RELATED APPLICATIONS

The present application claims the benefit of U.S. Provisional Application No. 63/191,991, filed May 22, 2021, entitled "HIGH DYNAMIC RANGE SCENE CUT DETECTION," which is hereby incorporated by reference in its entirety and for all purposes.

FIELD OF THE DISCLOSURE

The present disclosure generally relates to processing image and/or video data. In some examples, aspects of this application relate to performing high dynamic range (HDR) scene cut detection, such as HDR10+ scene cut detection.

BACKGROUND

Many devices and systems allow video data to be processed and output for consumption. Digital video data includes large amounts of data to meet the demands of consumers and video providers. For example, consumers of video data desire high quality video, including high fidelity, resolutions, frame rates, and the like. Various techniques have been developed for improving color, contrast, brightness, and/or other characteristics of videos and images. High dynamic range (HDR) is one example of a technique developed for improving color, contrast, and brightness of image and video data.

SUMMARY

Systems and techniques are described for performing high dynamic range (HDR) scene cut detection. According to one illustrative example, an apparatus for processing video data is provided. The apparatus comprises at least one memory and at least one processor (e.g., implemented in circuitry) coupled to the at least one memory. The at least one processor is configured to: determine a first characteristic of at least a first frame of a plurality of frames and a second characteristic of at least a second frame of the plurality of frames; determine whether a difference between the first characteristic and the second characteristic is greater than a threshold difference; determine a scene cut in the plurality of frames based a determination that the difference between the first characteristic and the second characteristic is greater than the threshold difference; and determine at least one smoothed histogram using a subset of frames of the plurality of frames, the subset of frames being based on the determined scene cut.

According to another illustrative example, a method of processing video data is provided. The method comprises: determining a first characteristic of at least a first frame of a plurality of frames and a second characteristic of at least a second frame of the plurality of frames; determining whether a difference between the first characteristic and the second characteristic is greater than a threshold difference; determining a scene cut in the plurality of frames based a determination that the difference between the first characteristic and the second characteristic is greater than the threshold difference; and determining at least one smoothed histogram using a subset of frames of the plurality of frames, the subset of frames being based on the determined scene cut.

According to another illustrative example, a non-transitory computer-readable medium is provided which has stored thereon instructions that, when executed by one or more processors, cause the one or more processors to: determine a first characteristic of at least a first frame of a plurality of frames and a second characteristic of at least a second frame of the plurality of frames; determine whether a difference between the first characteristic and the second characteristic is greater than a threshold difference; determine a scene cut in the plurality of frames based a determination that the difference between the first characteristic and the second characteristic is greater than the threshold difference; and determine at least one smoothed histogram using a subset of frames of the plurality of frames, the subset of frames being based on the determined scene cut.

According to another illustrative example, an apparatus for processing video data is provided. The apparatus comprises: means for determining a first characteristic of at least a first frame of a plurality of frames and a second characteristic of at least a second frame of the plurality of frames; means for determining whether a difference between the first characteristic and the second characteristic is greater than a threshold difference; means for determining a scene cut in the plurality of frames based a determination that the difference between the first characteristic and the second characteristic is greater than the threshold difference; and means for determining at least one smoothed histogram using a subset of frames of the plurality of frames, the subset of frames being based on the determined scene cut.

In some aspects, the method, apparatuses, and non-transitory computer-readable medium can include: starting from a current frame of the plurality of frames, searching in a first direction until it is determined that a difference between the first characteristic of the first frame and the second characteristic of the second frame is greater than the threshold difference; determining the first frame as a beginning of the determined scene cut; starting from the current frame of the plurality of frames, searching in a second direction until it is determined that a difference between a third characteristic of a third frame and a fourth characteristic of a fourth frame is greater than the threshold difference; and determining the third frame as an end of the determined scene cut. In some cases, the subset of frames includes frames of the plurality of frames between the first frame and the third frame.

In some aspects, the first characteristic includes a first lux index of at least the first frame and the second characteristic include a second lux index of at least the second frame.

In some aspects, the first characteristic includes a first correlated color temperature (CCT) of at least the first frame and the second characteristic include a second CCT of at least the second frame.

In some aspects, the first characteristic includes a first histogram of at least the first frame and the second characteristic include a second histogram of at least the second frame.

In some aspects, to determine the first characteristic of at least the first frame, the method, apparatuses, and non-transitory computer-readable medium can include determining a first lux index of at least the first frame. In some aspects, to determine the second characteristic of at least the second frame, the method, apparatuses, and non-transitory computer-readable medium can include determining a second lux index of at least the second frame. In some aspects, to determine that the difference between the first characteristic and the second characteristic is greater than the threshold difference includes, the method, apparatuses, and non-transitory computer-readable medium can include determining that a difference between the first lux index and the second lux index is greater than a lux index threshold.

In some aspects, to determine the first characteristic of at least the first frame, the method, apparatuses, and non-transitory computer-readable medium can include determining a first correlated color temperature (CCT) of at least the first frame. In some aspects, to determine the second characteristic of at least the second frame, the method, apparatuses, and non-transitory computer-readable medium can include determining a second CCT of at least the second frame. In some aspects, to determine that the difference between the first characteristic and the second characteristic is greater than the threshold difference includes, the method, apparatuses, and non-transitory computer-readable medium can include determining that a difference between the first CCT and the second CCT is greater than a CCT threshold.

In some aspects, to determine the first characteristic of at least the first frame, the method, apparatuses, and non-transitory computer-readable medium can include determining a first histogram of at least the first frame. In some aspects, to determine the second characteristic of at least the second frame, the method, apparatuses, and non-transitory computer-readable medium can include determining a second histogram of at least the second frame. In some aspects, to determine that the difference between the first characteristic and the second characteristic is greater than the threshold difference includes, the method, apparatuses, and non-transitory computer-readable medium can include determining that a difference between the first histogram and the second histogram is greater than a histogram history threshold.

In some aspects, to determine the at least one smoothed histogram based on the determined scene cut, the method, apparatuses, and non-transitory computer-readable medium can include: determining a plurality of smoothed histograms for the subset of frames based on a plurality of characteristics associated with the subset of frames; and determining the at least one smoothed histogram as a weighted sum of the plurality of smoothed histograms.

In some aspects, the first frame of the plurality of frames is a frame currently being encoded.

In some aspects, the method, apparatuses, and non-transitory computer-readable medium can include: storing the plurality of frames in a buffer.

In some aspects, the method, apparatuses, and non-transitory computer-readable medium can include: generating dynamic metadata including the at least one smoothed histogram. In some cases, the method, apparatuses, and non-transitory computer-readable medium can include: sending the dynamic metadata to a video encoder.

In some aspects, the apparatus is or is part of a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television, a vehicle (or a computing device of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
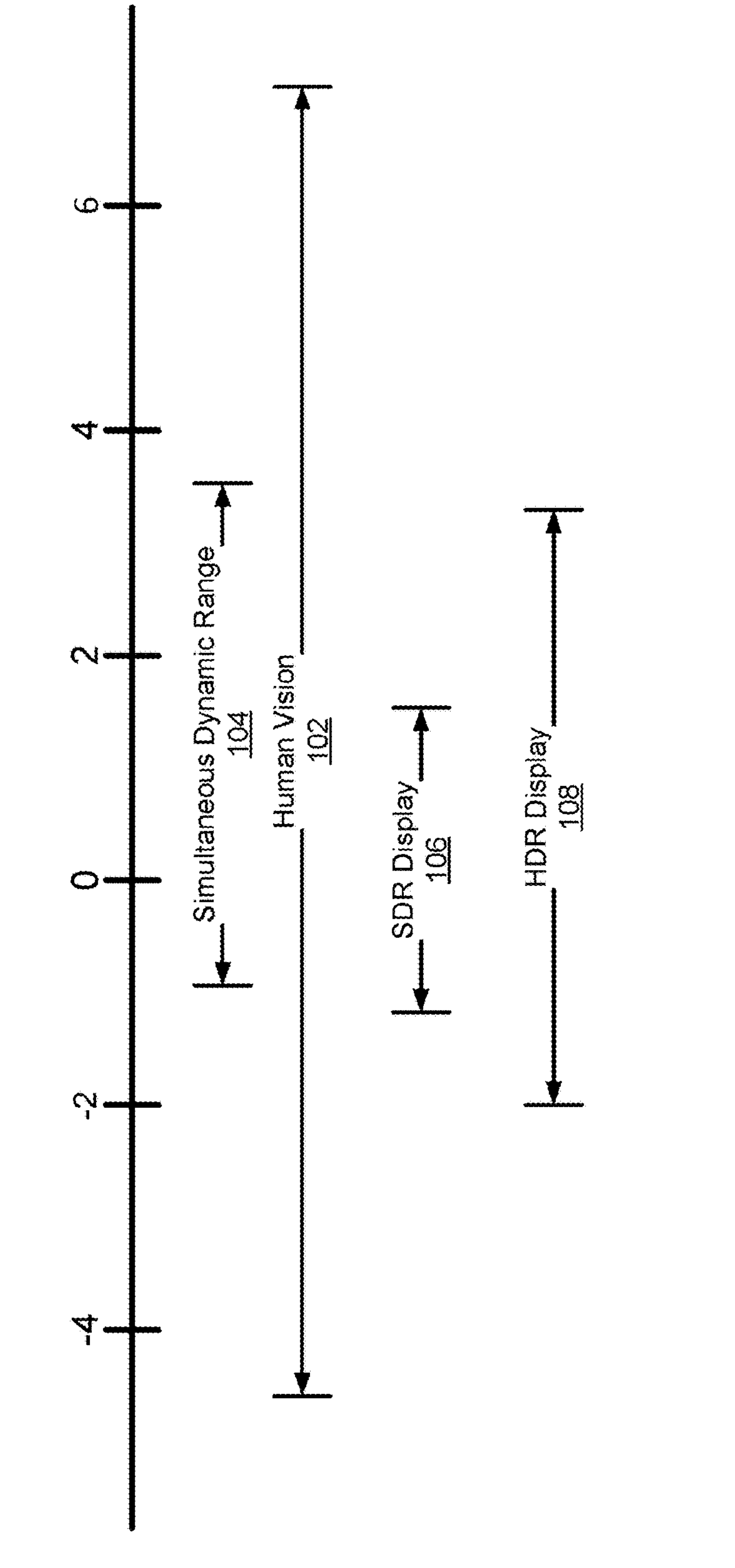
FIG. 1 is a diagram illustrating various dynamic ranges of the human vision and various display types, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides aspects only, and is not intended to limit the scope, applicability, or configuration of the disclosure. Rather, the ensuing descriptions of various aspects will provide those skilled in the art with an enabling description for implementing an aspect. It should be understood that various changes may be made in the function and arrangement of elements without departing from the spirit and scope of the application as set forth in the appended claims.

Dynamic range is the ratio between the largest and smallest values in a set of data. High dynamic range (HDR) is a relatively new standard for image and video data (e.g., for home entertainment and other uses). HDR provides enhancements in color, contrast, and brightness, such as compared to standard dynamic range (SDR). HDR10+ updates HDR10 by adding dynamic metadata that allows an HDR media device (e.g., a television, mobile device, desktop computer, and/or other media device) to adjust brightness levels on a scene-by-scene basis or frame-by-frame basis. HDR10+ obtains histogram statistics for each input frame. However, flickering issues can occur if a histogram is changed suddenly in a scene. Temporal consistency (e.g., robustness, smoothness, stability) is an important key performance indicator (KPI) on video performance.

Systems, apparatuses, processes (methods), and computer-readable media (collectively referred to as "systems and techniques") are described herein for performing scene cut detection. The systems and techniques can perform the scene cut detection and can determine a smoothed histogram for frames within the scene cut. The scene cut detection and histogram smoothing can improve the temporal consistency of video data, such as by avoiding luminance flickering while maintaining high quality HDR video. Details related to the systems and techniques will be described in more detail herein.

Next generation video applications are anticipated to operate with video data representing captured scenery with HDR and wide color gamut (WCG). Parameters of the utilized dynamic range and color gamut are two independent attributes of video content, and their specification for purposes of digital television and multimedia services are defined by several international standards. For example, Recommendation ITU-R BT.709-6 (denoted as Rec.709 or BT.709) defines parameters for high-definition television (HDTV), such as standard dynamic range (SDR) and standard color gamut, and ITU-R Recommendation BT.2020 (denoted as Rec.2020 or BT.2020) specifies Ultra-high-definition (UHD) television parameters such as HDR and WGC. There are also other documents specifying these attributes in other systems, (e.g. P3 color gamut is defined in Society of Motion Picture and Television Engineers (SMPTE)-231-2 and some parameters of HDR are defined in SMPTE-2084 (also denoted as ST-2084).

As noted above, dynamic range can be defined as the ratio between the minimum and maximum brightness of a video signal. Dynamic range can also be measured in terms of f-stops. For instance, in cameras, an f-stop is the ratio of the focal length of a lens to the diameter of camera's aperture. One f-stop can correspond to a doubling of the dynamic range of a video signal. As an example, MPEG defines HDR content as content that features brightness variations of more than 16 f-stops. In some examples, a dynamic range between 10 to 16 f-stops is considered an intermediate dynamic range, though in other examples such a dynamic range is considered an HDR dynamic range. The human visual system is capable for perceiving much larger dynamic range, however it includes an adaptation mechanism to narrow the simultaneous range. Current video application and services are regulated by Rec.709 and provide SDR, typically supporting a range of brightness (or luminance) of around 0.1 to 100 candelas (cd) per meter squared ($m^2$) (often referred to as "nits"), leading to less than 10 f-stops. Next generation video services are expected to provide dynamic range of up-to 16 f-stops and although detailed specification is currently under development, some initial parameters of have been specified in ST-2084 and Rec.2020.

FIG. 1 illustrates the dynamic range of typical human vision 102, in comparison with the dynamic range of various display types. FIG. 1 illustrates a luminance range 100, in a nits log scale (e.g., in $cd/m^2$ logarithmic scale). By way of example, starlight is at approximately 0.0001 nits on the illustrated luminance range 100, and moonlight is at about 0.01 nits. Typical indoor light may be between 1 and 100 on the luminance range 100. Sunlight may be between 10,000 nits and 1,000,000 nits on the luminance range 100.

Human vision 102 is capable of perceiving anywhere between less than 0.0001 nits to greater than 1,000,000 nits, with the precise range varying from person to person. The dynamic range of human vision 102 includes a simultaneous dynamic range 104. The simultaneous dynamic range 104 is defined as the ratio between the highest and lowest luminance values at which objects can be detected, while the eye is at full adaption. Full adaptation occurs when the eye is at a steady state after having adjusted to a current ambient light condition or luminance level. Though the simultaneous dynamic range 104 is illustrated in the example of FIG. 1 as between about 0.1 nits and about 3200 nits, the simultaneous dynamic range 104 can be centered at other points along the luminance range 100 and the width can vary at different luminance levels. Additionally, the simultaneous dynamic range 104 can vary from one person to another.

FIG. 1 further illustrates an approximate dynamic range for an SDR display 106 and an HDR display 108. SDR displays include monitors, televisions, tablet screens, smart phone screens, and other display devices that are capable of displaying SDR video. HDR displays include, for example, ultra-high-definition (HUD) televisions and other televisions, monitors, or display devices.

Rec. 709 provides that the dynamic range of an SDR display 106 can be about 0.1 to 100 nits, or about 10 f-stops, which is significantly less than the dynamic range of human vision 102. The dynamic range of SDR displays 106 is also less than the illustrated simultaneous dynamic range 104. Some video application and services are regulated by Rec.709 and provide SDR, typically supporting a range of brightness (or luminance) of around 0.1 to 100 nits. An SDR display 106 is also unable to accurately reproduce night time conditions (e.g., starlight, at about 0.0001 nits) or bright outdoor conditions (e.g., around 1,000,000 nits).

As noted above, next generation video services are expected to provide dynamic range of up-to 16 f-stops. The HDR display 108 can cover a wider dynamic range than can an SDR display 106. For example, an HDR display 108 may have a dynamic range of about 0.01 nits to about 5600 nits (or 16 f-stops). While the HDR display 108 also does not encompass the dynamic range of human vision, the HDR display 108 may come closer to being able to cover the simultaneous dynamic range 104 of the average person. Specifications for dynamic range parameters for the HDR display 108 can be found, for example, in Rec.2020 and ST-2084.

Figure 2:
FIG. 2 is a diagram illustrating an example of a chromaticity diagram, overlaid with a triangle representing a standard dynamic range (SDR) color gamut and a triangle representing a high dynamic range (HDR) color gamut, in accordance with some examples.
Figure 2:
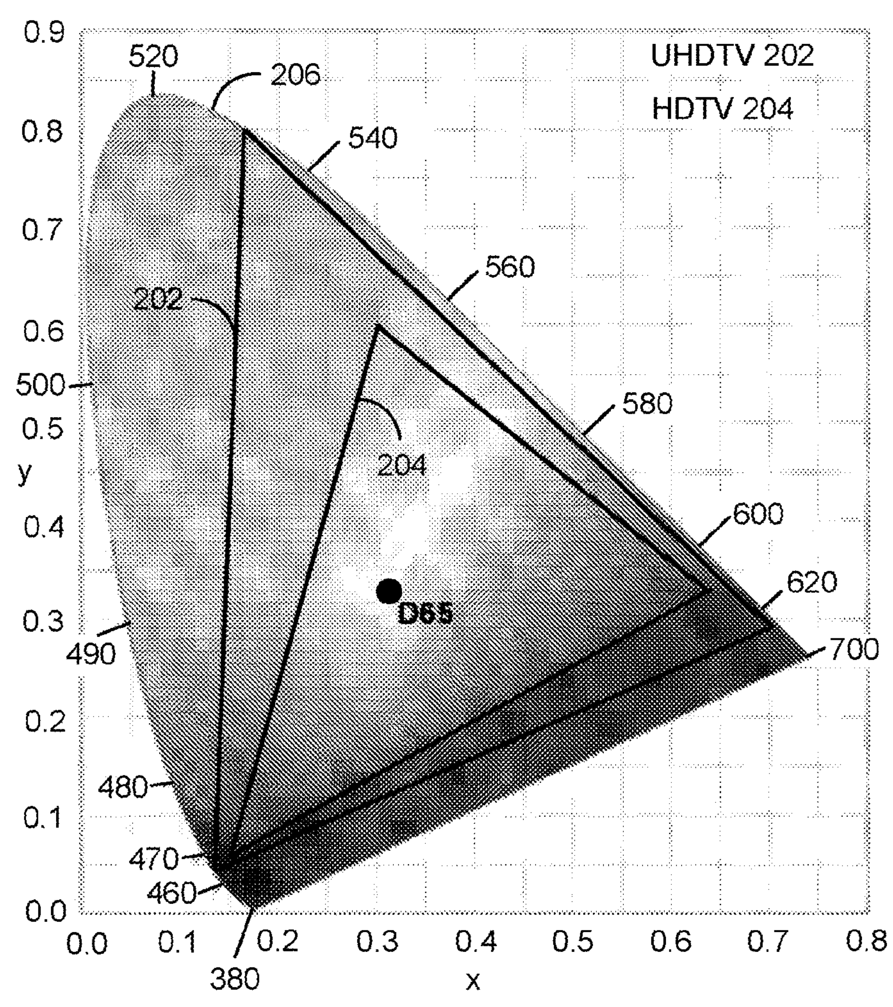

Color gamut describes the range of colors that are available on a particular device, such as a display or a printer. Color gamut can also be referred to as color dimension. FIG. 2 illustrates an example of a chromaticity diagram 200, overlaid with a triangle representing an SDR color gamut 204 and a triangle representing an HDR color gamut 202. Values on the curve 206 in the diagram 200 are the spectrum of colors; that is, the colors evoked by a wavelength of light in the visible spectrum. The colors below the curve 206 are non-spectral: the straight line between the lower points of the curve 206 is referred to as the line of purples, and the colors within the interior of the diagram 200 are unsaturated colors that are various mixtures of a spectral color or a purple color with white. A point labeled D65 indicates the location of white for the illustrated spectral curve 206. The curve 206 can also be referred to as the spectrum locus or spectral locus, representing limits of the natural colors.

The triangle representing an SDR color gamut 204 is based on the red, green, and blue color primaries as provided by Rec.709. The SDR color gamut 204 is the color space used by HDTVs, SDR broadcasts, and other digital media content.

The triangle representing the wide HDR color gamut 202 is based on the red, green, and blue color primaries as provided by Rec.2020. As illustrated by FIG. 2, the HDR color gamut 202 provides about 70% more colors than the SDR color gamut 204. Color gamuts defined by other standards, such as Digital Cinema Initiatives (DCI) P3 (referred to as DCI-P3) provide even more colors than the HDR color gamut 202. DCI-P3 is used for digital move projection.

Table 1 illustrates examples of colorimetry parameters for selected color spaces, including those provided by Rec.709, Rec.2020, and DCI-P3. For each color space, Table 1 below provides an x and a y coordinate for a chromaticity diagram.

TABLE 1

| Color | White Point | | Primary Colors | | | | | |
|---|---|---|---|---|---|---|---|---|
| Space | $x_w$ | $y_w$ | $x_r$ | $y_r$ | $x_g$ | $y_g$ | $x_b$ | $y_b$ |
| DCI-P3 | 0.314 | 0.351 | 0.68 | 0.32 | 0.265 | 0.69 | 0.15 | 0.06 |
| Rec.709 | 0.3127 | 0.329 | 0.64 | 0.33 | 0.3 | 0.6 | 0.15 | 0.06 |
| Rec.2020 | 0.3127 | 0.329 | 0.708 | 0.292 | 0.170 | 0.797 | 0.131 | 0.046 |

Figure 3:
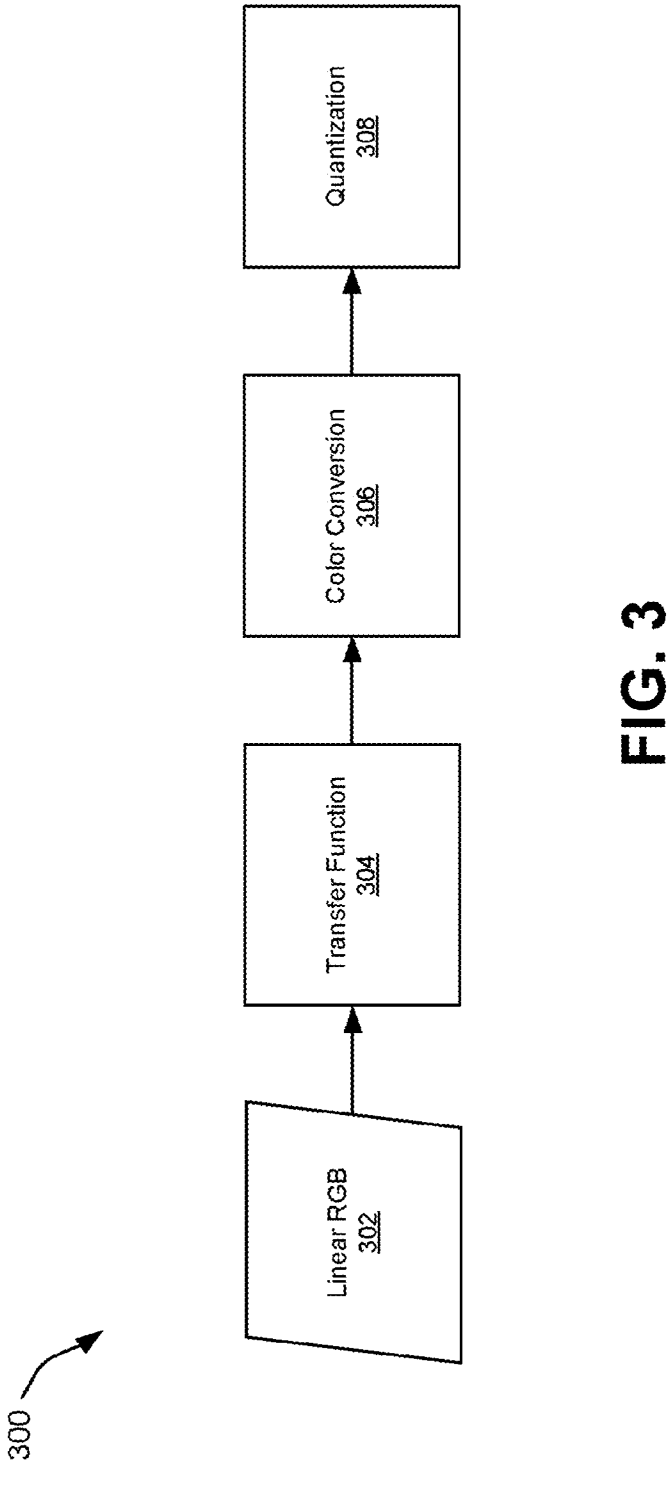
FIG. 3 is a diagram illustrating an example of a process for performing HDR/wide color gamut (WCG) representation conversion, in accordance with some examples.

FIG. 3 illustrates an example of a process 300 for performing HDR video data format conversion, such as for purposes of encoding or compression at an encoding device (e.g., a video encoding device 1204). The HDR data may have a lower precision and may be more easily compressed. The example process 300 includes a non-linear transfer function 304 that processes video data including linear RGB data 302. The non-linear transfer function 304 can compact the dynamic range of the linear RGB data 302. The process 300 also includes a color conversion 306 that can produce a more compact or robust color space. The process 300 further includes a quantization 308 function that can convert floating point representations to integer representations (quantization).

Figure 4:
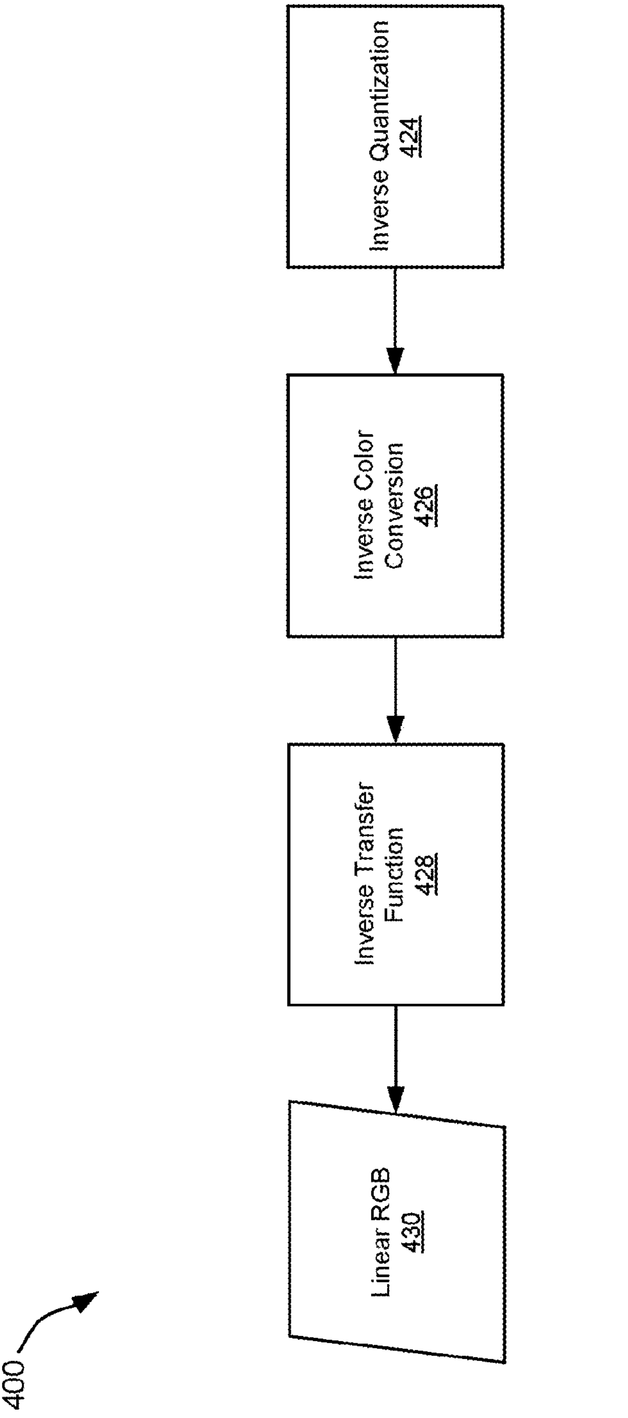
FIG. 4 is a diagram illustrating an example of a process for performing inverse HDR/WCG conversion, in accordance with some examples.

FIG. 4 illustrates an example of a process 400 for performing an inverse conversion for HDR video data, which can be performed by a device receiving encoded or compressed image or video data (e.g., by a media player and/or decoding device, such as decoding device 1312). The example process 400 performs inverse quantization 424 (e.g., for converting integer representations to floating point representations), an inverse color conversion 426, and an inverse transfer function 428 function to generate linear RGB data 430.

In various examples, the high dynamic range of input RGB data in linear and floating point representation can be compacted using the non-linear transfer function 304. An illustrative example of a non-linear transfer function 304 is the perceptual quantizer defined in ST-2084. The output of the transfer function 304 can be converted to a target color space by the color conversion 306. The target color space can be one (e.g., YCbCr) that is more suitable for compression by the encoding device. Quantization 308 can then be used to convert the data to an integer representation.

The order of the steps of the example processes 300 and 400 are illustrative examples of the order in which the steps can be performed. In other examples, the steps can occur in a different order. For example, the color conversion 306 can precede the transfer function 304. In another example, the inverse color conversion 426 can be performed after the inverse transfer function 428. In other examples, additional processing can also occur. For example, spatial subsampling may be applied to color components.

The transfer function 304 can be applied to the data in an image to compact the dynamic range of the data. Compacting the dynamic range may enable video content to represent the data with a limited number of bits. The transfer function 304 can be a one-dimensional, non-linear function that can either reflect the inverse of the electro-optical transfer function (EOTF) of an end consumer display (e.g., as specified for SDR in Rec.709), or can approximate the human visual system's perception of brightness changes (e.g., as a provided for HDR by the perceptual quantizer (PQ) transfer function specified in ST-2084 for HDR). An electro-optical transfer function (EOTF) describes how to turn digital values, referred to as code levels or code values, into visible light. For example, the EOTF can map the code levels back to luminance. The inverse process of the electro-optical transform is the optical-electro transform (OETF), which produce code levels from luminance.

As noted above, HDR provides enhancements in color, contrast, and brightness, for example when compared to SDR image or video data. Standard HDR10 uses static metadata, in which case the boundaries of brightness are set at the start of an item of media content (e.g., a movie, show, etc.) and stays static for the duration of the item of media content. A new standard referred to as HDR10+ provides an update to standard HDR10 by adding dynamic metadata that allows an HDR media device (e.g., a television, mobile device, desktop computer, laptop computer, tablet computer, extended reality device (XR) such as a virtual reality (VR), augmented reality (AR) or mixed reality (MR) device, and/or other media device) to adjust brightness levels on a scene-by-scene basis or frame-by-frame basis. HDR10+ can allow content creators (e.g., filmmakers) to decide exactly how content captured in an item of media content (e.g., a movie, show, etc.) should look when output on a display of a media device. The dynamic metadata format is based on SMPTE ST 2094-40. HDR10+ is an open standard and is royalty-free, and is an embedded feature supported by various processors.

Figure 5A:
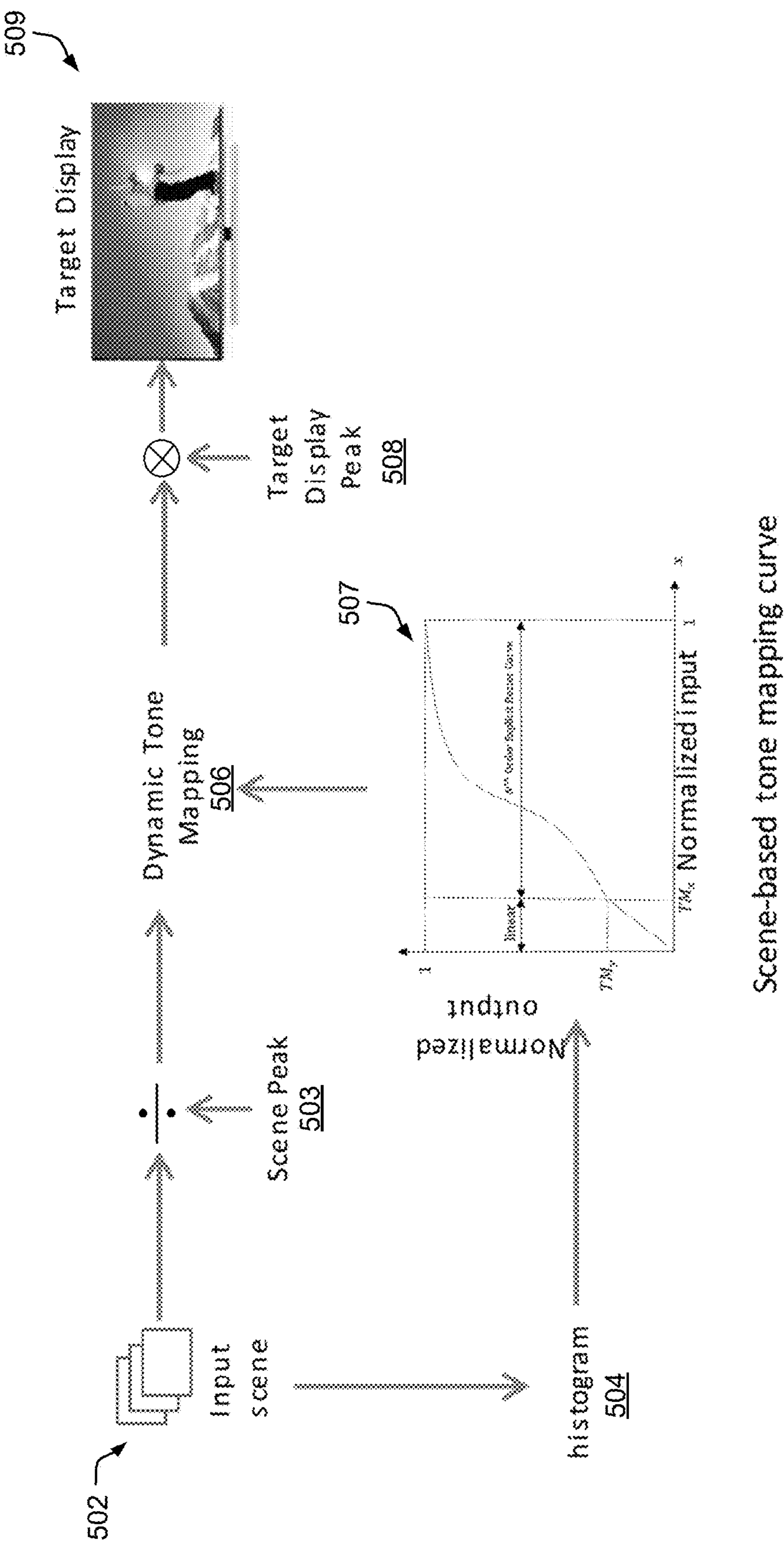
FIG. 5A is a diagram illustrating an example of an HDR10+ implementation, in accordance with some examples.

According to HDR10+, histogram statistics are obtained for each input frame. For example, an HDR10+ library may obtain histogram statistics of each input frame. FIG. 5A is a diagram illustrating an example of an HDR10+ implementation. For example, a device can obtain frames 502 of an input scene from a frame source (e.g., an image sensor such as a camera, storage, a server, etc.). The device can determine a histogram for each frame. An example of a histogram 504 for a frame from the frames 502 of the input scene is shown in FIG. 5A. The device can use the histogram 504 to determine a tone mapping curve 507 for the frame. The device can also determine percentiles for the frame from the histogram 504. The percentiles include different percentages (e.g., 20%, 30%, 50%, 70%, etc.) of pixel values that fall within ranges of luminance values from the histogram. The device can convert the percentiles to a target display peak 508 (described below) using the tone mapping curve 507. For instance, an HDR engine (e.g., an HDR10+ library) of the device can calculate percentiles and a tone mapping curve 507 for the frame based on the histogram 504. The HDR engine can include the percentiles and tone mapping curve(s) in dynamic metadata.

The device can normalize the pixel values of each frame by dividing the values by a scene peak 503 (also referred to as a content peak). The scene peak 503 indicates the maximum brightness of the scene depicted by an image. The device can then perform dynamic tone mapping 506 by applying the tone mapping curve 507 to the normalized values. For instance, the device can use the tone mapping curve 507 to map the entire dynamic range of the frame into a range of values that are displayable by a display 509. As shown, the device can multiply the tone mapped values by a target display peak 508. The target display peak 508 is the maximum brightness (luminance) value that the display 509 can display. As noted above, the device can convert the percentiles derived from the histogram 504 to a target display peak 508 (described below) using the tone mapping curve 507. In some examples, the device can also encode and transmit the video data and dynamic metadata to a receiving device. The receiving device (or a display of the receiving device) that receives the video data and the dynamic metadata can apply one or more tone mapping curves stored in the dynamic metadata for each frame of the received video data.

Figure 5B:
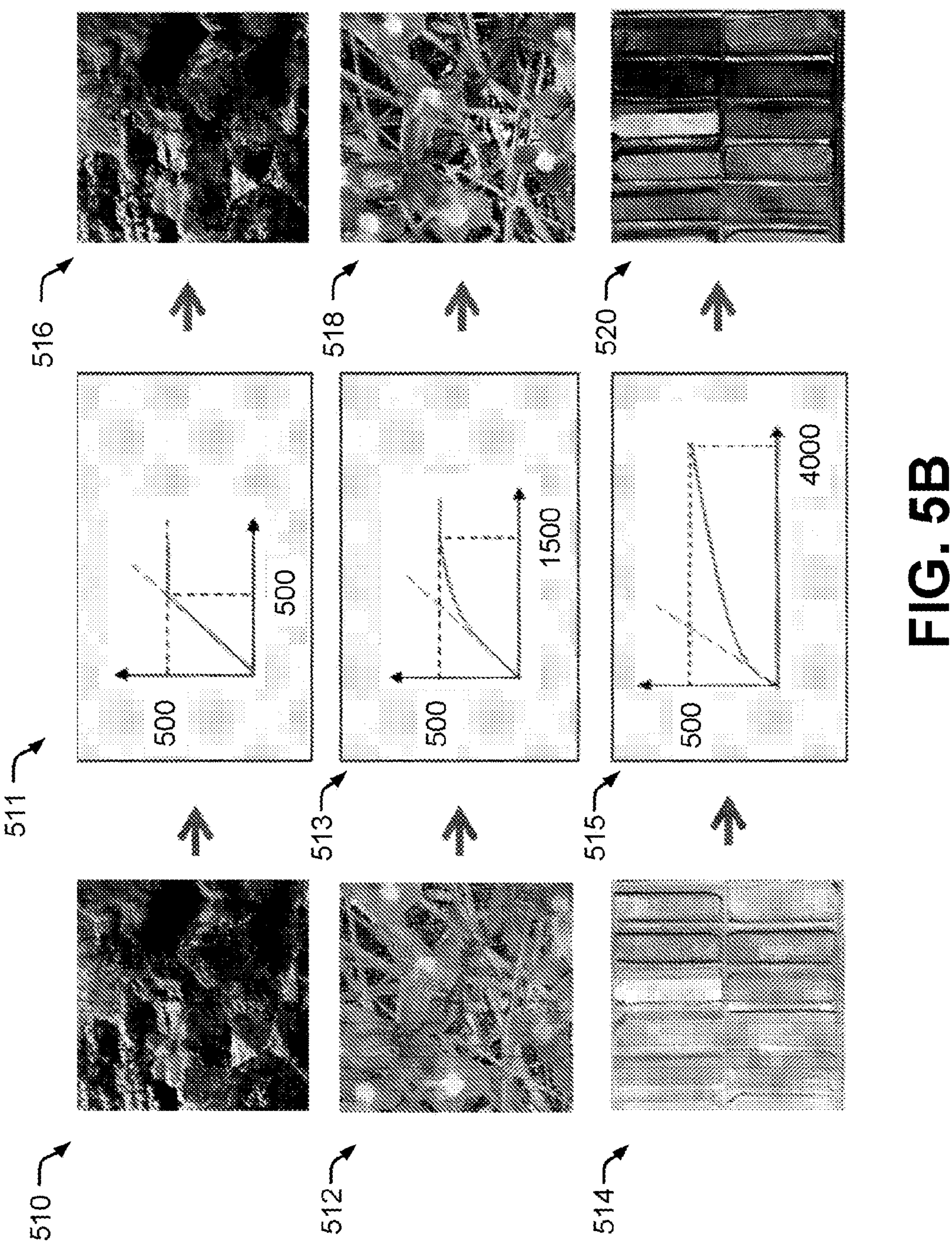
FIG. 5B is a diagram illustrating an example of tone mapping using various tone mapping curves, in accordance with some examples.

FIG. 5B is a diagram illustrating various additional examples of tone mapping that can be performed by the device. For example, a frame 510 is of a low dynamic range scene. The frames 512 and 514 are of high dynamic range scenes. A device can determine a tone mapping curve 511 based on a histogram of the frame 510, a tone mapping curve 513 based on a histogram of the frame 512, and a tone mapping curve 515 based on a histogram of the frame 514. The numbers on the x-axis of the tone mapping curves (e.g., the value of 500 in the tone mapping curve 511, the value of 1500 in the tone mapping curve 513, and the value 4000 in the tone mapping curve 515) indicate the scene or content peak. The numbers on the y-axis of the tone mapping curves (e.g., the value of 500 in the tone mapping curve 511, the value of 500 in the tone mapping curve 513, and the value 500 in the tone mapping curve 515) indicate the scene or content peak.

If the maximum peak of the content (the scene or content peak) of a frame is equal to or smaller than the display peak, then a device does not need to perform tone mapping because all pixels of the frame can be displayed by the display 509. For instance, as shown, the scene peak value (500) of the frame 510 is equal to the target display peak value (500) of the display 509, in which case an output frame 516 can be the same as the frame 510. However, if the maximum scene peak is larger than the target display peak, then the device needs to perform suppression of the luminance values (to suppress the brightness) to ensure that the display 509 can properly display all of the pixels of the frame. For instance, as shown in FIG. 5B, the scene peak value (1500) of the frame 512 is larger than the target display peak value (500) of the display 509. Also, the scene peak value (4000) of the frame 514 is larger than the target display peak value (500) of the display 509. Accordingly, the tone mapping curve 513 is applied to the frame 512 to generate a displayable frame 518. Similarly, the tone mapping curve 515 is applied to the frame 514 to generate a displayable frame 520.

A device can perform dynamic tone mapping to apply a different tone mapping curve from scene-to-scene (or frame-to-frame in some cases) in an item of media content (e.g., a video) in order to limit the dimming and desaturation of the display that happens from static tone mapping. In contrast, static tone mapping applies the same adaptation across an entire item of media content (e.g., for both bright and dark scenes). With dynamic tone mapping, a device can apply an individualized tone map adaptively for each scene (or frame) allowing vibrant visual results and achieving good picture quality that better matches the intent of the content creator. The dynamic metadata used in HDR10+ is used to provide the display with an adequate amount of information to accurately reproduce and retain the intent of the original content. The device can include scene characteristics (e.g., binned statistics, such as percentiles and one or more tone mapping curves derived from histogram(s)) of all pixel values in the dynamic metadata, as needed per scene or per frame. The binned statistics of a scene can show how bright or dark the important scene details should be. A device receiving the dynamic metadata (or a display of the device) can then apply a guided tone mapping curve based on the information included in the dynamic metadata.

Figure 6:
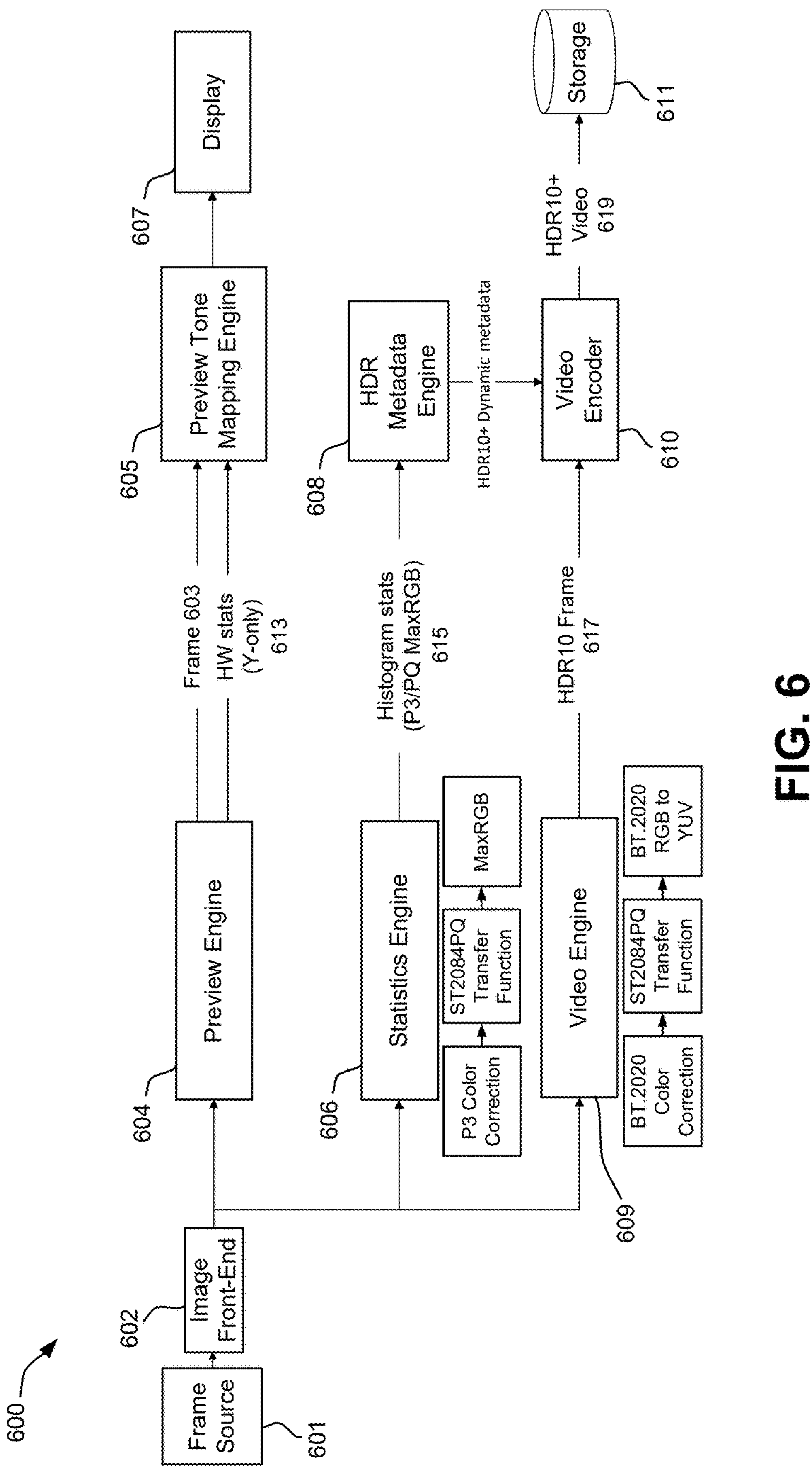
FIG. 6 is a diagram illustrating an example of a system for generating HDR content according to the HDR10+ standard, in accordance with some examples.

FIG. 6 is a diagram illustrating an example of a system 600 for generating HDR content with dynamic metadata, such as according to the HDR10+ standard. As shown in FIG. 6, an image-front end (IFE) 602 receives and processes image data (e.g., raw image data or full image frames) received from a frame source 601. For instance, in some cases, the frame source 601 can include an image sensor, in which case the IFE 602 can receive raw image data from the image sensor and can process the raw image data to generate output frames. In some cases, the frame source 601 can include one or more image capture devices and/or one or more video capture devices (e.g., a digital camera, a digital video camera, a phone with a camera, a tablet with a camera, or other suitable capture device), an image and/or video storage device, an image and/or video archive containing stored images, an image and/or video server or content provider providing image and/or video data, an image and/or video feed interface receiving images from a video server or content provider, a computer graphics system for generating computer graphics image and/or video data, a combination of such sources, or other source of image frame content. In some cases, multiple frame sources can provide frames to the system 600. A frame can be a red-green-blue (RGB) frame having red, green, and blue color components per pixel; a format including luminance and chrominance components such as chroma-red and chroma-blue components (e.g., YUV, YCbCr, etc.) per pixel; or any other suitable type of color or monochrome picture. In some examples, the frames can be received in a RGB format and the IFE 602 can convert the frames to a YUV format.

A preview engine 604 can generate preview frames based on the output from the IFE 602. The preview engine 604 can be configurable based on the color space of the display 607. For example, the preview engine 604 can output the preview frames 603 in a configurable color space that the display 607 requests (e.g., P3 color space, standard RGB (sRGB) color space, etc.). The preview engine 604 can also output luminance (Y)-only statistics 613 in a preview color space for preview tone mapping. A preview tone mapping engine 605 can perform the preview tone mapping using the output luminance (Y)-only statistics to generate frames that can be displayed by the display 607 with better visual quality as compared to the frames output by the IFE 602. The preview tone mapping engine 605 can output the tone mapped frames to a display 607.

A statistics engine 606 converts histogram statistics 615 into a particular domain for dynamic metadata generation. The histogram used for HDR10+ is a MaxRGB histogram in the P3 domain. For example, as shown in FIG. 6, the statistics engine can convert the color space of a frame to the P3 color domain (by applying P3 color correction) and can then apply an ST2084 PQ transfer function to determine a MaxRGB histogram for the frame. The statistics engine 606 can output the histogram statistics 615, which are received by an HDR metadata engine 608. In some cases, the HDR metadata engine 608 may receive the histogram statistics of each input frame processed by the IFE 602. In some aspects, the HDR metadata engine 608 can include an HDR10+ library (Lib). As noted above, an HDR10+ lib uses the histogram statistics to generate dynamic metadata (e.g., including percentiles and tone mapping curve(s)).

A video engine 609 can also receive the frames from the IFE 602. The video engine can process the received frames to generate HDR frames, 617 such as HDR10 frames or other HDR frames. For instance, the color space requirement is BT.2020 for an HDR10 frame. To generate an HDR frame from a frame received from the IFE 602, the video engine 609 can apply a BT.2020 color correction to the frame and can then apply the ST2084 PQ transfer function. In such cases, the video engine can also apply BT.2020 RGB to YUV conversion metrics to generate HDR10 output frames.

A video encoder 610 can receive the HDR frames from the video engine 609. The video encoder 610 can then generate encoded video data 619 from the HDR frames. For instance, the video encoder 610 can encode an HDR10 frame to generate encoded video data 619. The video encoder 610 can insert the HDR10+ dynamic metadata received from the HDR metadata engine 608 into one or more video headers of the encoded video data. The video encoder 610 can output the encoded video data 619 to storage 611 (e.g., dynamic random access memory (DRAM), a secure digital (SD) card, or other memory). The video encoder 610 can transmit the encoded video data to a server (e.g., a cloud server) or another device (e.g., a player device including a video decoder). An example video encoder and decoder are described below with respect to FIG. 12 and FIG. 13.

As described above, the HDR metadata engine 608 obtains the histogram statistics (e.g., MaxRGB statistics) of each frame. For instance, for each frame, the HDR metadata engine 608 can calculate percentiles and a tone mapping curve from the histogram of each frame. The video encoder 610 can then include the percentiles and tone mapping curve in the dynamic metadata (e.g., HDR10+ dynamic metadata). A device (or a display of the device) that receives the encoded video with the dynamic metadata (including the tone mapping curves and percentiles) can apply the tone mapping curves to the frames for display. However, because the HDR metadata engine 608 generates the tone mapping curve based on each frame's percentiles, there may be luminance flickering if the histograms change suddenly in a scene. The flickering can be due to different tones being displayed on a scene-by-scene (or frame-by-frame in some cases) basis. Such flickering can lead to visual issues, as temporal consistency (e.g., robustness, smoothness, and stability) is an important key performance indicator (KPI) on video performance. Therefore, systems and techniques are needed to improve HDR techniques, such as to avoid luminance flickering while maintaining the high-quality effects of HDR.

Systems, apparatuses, processes (methods), and computer-readable media (collectively referred to as "systems and techniques") are described herein for performing scene cut detection and histogram smoothing. As used herein, a scene cut can refer to a scene boundary (e.g., a boundary between scenes in a video) or a point within a scene where the luminance (brightness) or color changes by a certain amount. For instance, a scene cut may not necessarily refer to an actual change in scenes, but may include a change in illumination or color by a certain amount (e.g., defined by one or more thresholds as described herein). In some examples, given frame characteristics (also referred to as camera data) for each frame, the systems and techniques can detect a scene cut (e.g., a scene boundary, change in luminance or color, etc.) and can perform histogram smoothing using frames within the scene cut. The frame characteristics can include a lux index, a correlated color temperature (CCT), a histogram, and/or other characteristics. For instance, the systems and techniques can use the lux indexes, correlated color temperatures (CCTs), and/or history histograms for the frames to find beginning and ending points defining scene cuts according to image brightness, color, and/or image content. The frame characteristics allow the systems and techniques to detect the scene cut robustly. In some cases, for example due to memory constraints, frame buffers can be used to detect the scene cut.

The scene cut detection and histogram smoothing described herein can improve the temporal consistency of video data (e.g., to provide better temporal consistency for HDR10+ content). For instance, the scene cut detection and histogram smoothing can be used to mitigate the flickering of local luminance (brightness) changes within the scene and, at the same time, can maintain the positive effects of HDR content.

While examples are described herein using HDR10+ for illustrative purposes, the systems and techniques described herein can be performed for any type of image and/or video data. The examples described herein can be performed individually or in any combination.

Figure 7:
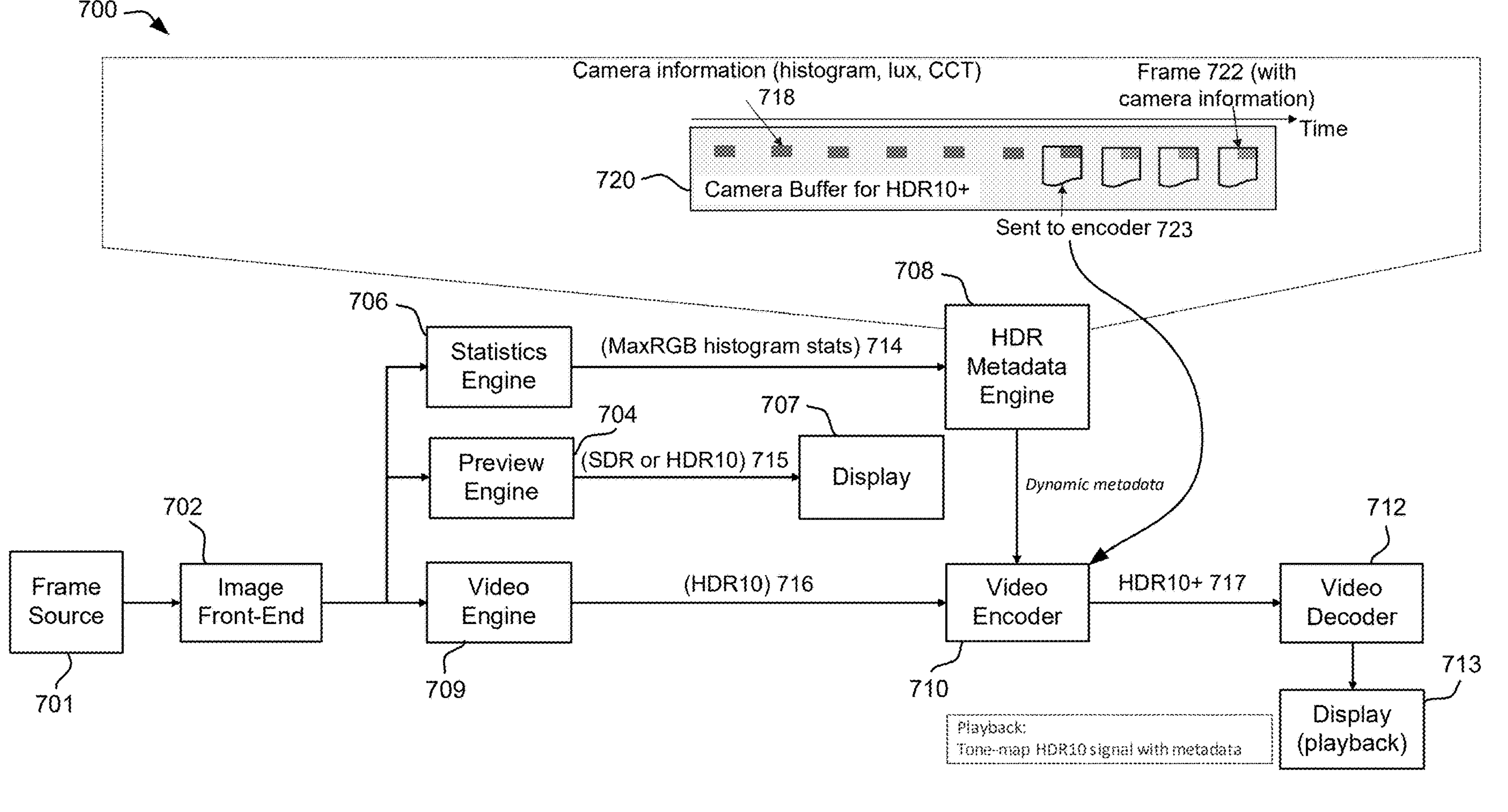
FIG. 7 is a diagram illustrating an example of a system for implementing scene cut detection and histogram smoothing, in accordance with some examples.

FIG. 7 is a diagram illustrating an example of a system 700 for implementing the scene cut detection and histogram smoothing techniques described herein. Similar to that of FIG. 6, an image front-end (IFE) 702 receives frame data from a frame source 701 (e.g., an image sensor, a camera, a storage device, etc.) and outputs one or more frames to a preview engine 704, a statistics engine 706, and a video engine 709. The preview engine 704 can be similar to and can perform similar operations as the preview engine 604 and/or the preview tone mapping engine 605 of FIG. 6. As shown, the preview engine 704 outputs SDR and/or HDR content 715 (e.g., HDR10 preview frames) to a display 707. The video engine 709 can be similar to and can perform similar operations as the video engine 609 of FIG. 6. For instance, the video engine 709 generates HDR video 716 from the frames received from the FIE 702, such as using the techniques described above with respect to FIG. 6. The video engine 709 can then output the HDR video (e.g., HDR10 video) to a video encoder 710.

The statistics engine 706 outputs MaxRGB histogram statistics 714 (e.g., in a P3/PQ domain) for HDR10+ dynamic metadata generation by the HDR metadata engine 708. The statistics engine 706 can be similar to and can perform similar operations as the statistics engine 606 of FIG. 6. In some examples, the HDR metadata engine 708 can include an HDR10+ lib. As noted above, the HDR metadata engine 708 (e.g., HDR10+ lib) can use the histogram statistics to generate dynamic metadata (e.g., including percentiles and tone mapping curve(s)) for one or more frames (e.g., the frames in the camera buffer 720 shown in FIG. 7).

Figure 8:
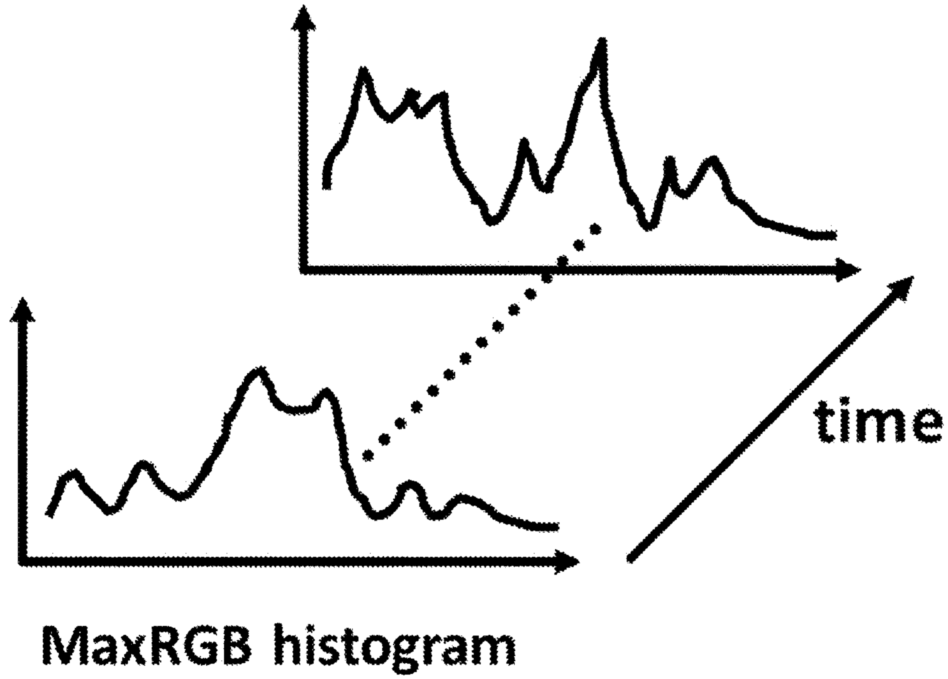
FIG. 8 is a diagram illustrating an example of changing of histogram statistics over time, in accordance with some examples.

The histogram provided by the statistics engine 706 can change frame-by-frame in a sequence of video frames (or other sequence of frames or images). FIG. 8 illustrates the changing of MaxRGB histogram statistics over time (e.g., corresponding to changes in histogram data frame-by-frame). In some cases, the histogram statistics may change dramatically from frame-to-frame if there is brightness glitch or sudden brightness change in a scene. According to the techniques described herein, the HDR metadata engine 708 can perform histogram smoothing based on scene cut detection. For instance, for each frame within a detected scene cut, the HDR metadata engine 708 can obtain the MaxRGB histogram in the P3/PQ domain from the statistics engine 706. The HDR metadata engine 708 can generate a smoothed histogram for each frame in the scene cut using frame lux index, CCT, and/or history of histograms, as described in more detail below. The HDR metadata engine 708 can then calculate percentiles and/or a tone mapping curve (e.g., an opto-optical transfer function (OOTF) curve) from the smoothed histogram. The HDR metadata engine 708 can pack or otherwise include the percentiles and the tone mapping curve into dynamic metadata. The HDR metadata engine 708 can send the dynamic metadata to the video encoder 710.

The video encoder 710 can be similar to and can perform similar operations as the video encoder 610 of FIG. 6. For instance, the video encoder 710 can encode the HDR10 video signal and can insert HDR10+ dynamic metadata (described below) into the encoded video data 717 (e.g., in one or more video headers of the encoded video data, in one or more parameter sets (e.g., a video parameter set (VPS), a sequence parameter set (SPS), a picture parameter set (PPS), etc., and/or otherwise included in or with the encoded video data), as described above with respect to FIG. 6. Once the frame is encoded by video encoder, the frame can be removed from the camera buffer 720. For example, the frames with camera information (e.g., frame lux, CCT, and/or histogram information) illustrated in FIG. 7 with an outline (e.g., frame 722) are not yet encoded by the video encoder 710. After being sent to encoder (as shown by operation 723) and being encoded by the video encoder 710, the frames are removed from the buffer, while the camera information for each frame is maintained in the buffer 720. The camera information 718 maintained in the buffer 720 for each frame is used for determining scene cuts and for determining smoothed histograms for subsequent frames in the video. For instance, as described in more detail below, from the perspective of a current frame (e.g., a frame currently being encoded), a certain number of frames prior to the current frame and a certain number of frames after the current frame can be used to determine a scene cut. The camera information 718 (e.g., frame lux, CCT, and/or histogram information) of the frames within the scene cut can then be used to determine a smoothed histogram for the current frame.

The video encoder 710 can store the encoded HDR10+ video 717 with dynamic metadata in a storage (not shown) and/or can transmit the video to another device (e.g., another media device, a server, etc.) that includes a video decoder 712. The video decoder 712 can decode the video and can output the decoded video to a display 713 for playback. The display 713 can perform tone mapping on the decoded video frames using the dynamic metadata. As noted above, an example video encoder and video decoder are described below with respect to FIG. 12 and FIG. 13, respectively.

Figure 9A:
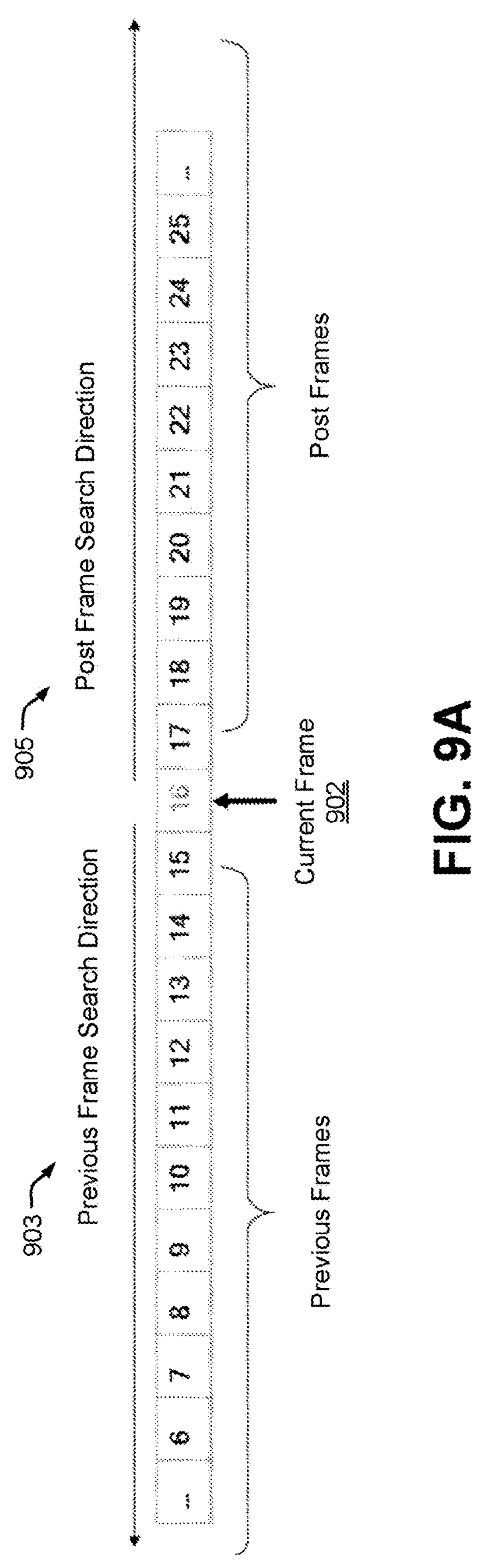
FIG. 9A is a diagram illustrating an example of histogram smoothing, in accordance with some examples.

FIG. 9A is a diagram illustrating an example of determining a scene cut. For example, the HDR metadata engine 708 (e.g., HDR10+ lib) of FIG. 7 can buffer a certain number of frames (e.g., 31 frames). In some cases, the frames can be buffered due to memory constraints (e.g., to limit the burden on memory resources, such as DRAM). In the example of FIG. 9A, where 31 frames are used as an illustrative example, the HDR metadata engine 708 can analyze the characteristics (e.g., camera information such as lux indexes, CCTs, and histograms) of the previous 15 frames and the post 15 frames from the perspective of a current frame 902 that is being encoded to determine a scene cut and a smoothed histogram. For example, starting at the current frame 902 being encoded, the HDR metadata engine 708 can search in two directions. The HDR metadata engine 708 can stop searching in a particular direction when a first characteristic of at least a first frame of the 31 frames and a second characteristic of at least a second frame of the 31 frames is greater than a threshold difference. For instance, the HDR metadata engine 708 can search in the two directions (e.g., starting at the current frame that is being encoded) and can stop searching when the difference of one or more of the lux index, the CCT, and/or the histogram count between a current frame and another frame within the buffer is greater than one or more pre-defined thresholds. The HDR metadata engine 708 can smooth the histogram for the current frame using characteristics of the other frames (e.g., histograms of each frame) within two stop points defining the scene cut or other number of stop points defining the scene cut.

In some cases, as noted above, histogram smoothing can be performed based on a lux index (e.g., corresponding to image brightness) difference. For instance, a lux index can be indicative of the brightness of the pixels within a frame. In some cases, the lux index can be based on one or more automatic exposure control (AEC) conditions per frame. A delta of lux index values between frames being larger than (or equal to in some cases) a lux index threshold can indicate a possible scene change. For instance, the HDR metadata engine 708 (e.g., HDR10+ lib) can search in two directions (e.g., starting at the current frame that is being encoded, such as current frame 902 of FIG. 9A). When searching in each direction, the HDR metadata engine 708 can determine when a difference or delta of a lux index between two frames exceeds (or is equal to in some cases) the lux index threshold. In one example referring to FIG. 9A, when searching in the previous frame search direction 903, if the HDR metadata engine 708 determines that the difference in lux index values of frame 7 and frame 6 is greater than the lux index threshold, the HDR metadata engine 708 can determine that a stop point (e.g., defining a beginning of a scene cut) is present at frame 7. The HDR metadata engine 708 can perform a similar search in the post frame search direction 905 to identify another stop point (e.g., defining an end of a scene cut). The frames between the two stop points (and thus within the scene cut) can be referred to as a subset of frames of the entire plurality of frames of the item of media content (e.g., video). Once the HDR metadata engine 708 determines that the difference or delta of the lux index values between the current frame and another frame in each search direction is greater than (or equal to in some cases) the lux index threshold, the HDR metadata engine 708 can stop searching and determine a smoothed histogram using the frames within the two stop points (or other number of stop points). An example of histogram smoothing performed based on a lux index is as follows:

$$Hist_L = \frac{\sum hist_i \times w_i}{\sum w_i},$$

$$wi = \begin{cases} 1, & \text{abs}(lux_{current} - lux_i) < Th_L \\ 0, & \text{otherwise} \end{cases}.$$

Where $hist_i$ is the histogram of each frame in the buffer, $w_i$ is a weight (e.g., a value of 0 or 1, or a value between 0 and 1), $lux_{current}$ is the lux index of the current frame, $lux_i$ is lux index value of each frame in the buffer, and $Th_L$ is the lux index threshold. For example, according to the Hist equation above, if the difference between the current lux index $lux_{current}$ and the lux index $lux_i$ of one or more frames within the buffer is less than the lux index threshold $Th_L$, the weight $w_i$ will be set to 1. In such cases, the histograms $hist_i$ of the frames that have a lux index value within the lux index threshold $Th_L$ of the current frame's lux index value $lux_{current}$ will be used to determine a smoothed histogram $Hist_L$ for the current frame. Otherwise, if the difference between the current lux index $lux_{current}$ and the lux index $lux_i$ of one or more frames within the buffer is greater (or equal to in some cases) than the lux index threshold $Th_L$, the weight $w_i$ will be set to 0. In such cases, the histograms $hist_i$ of the frames that have a lux index value difference from the current frame's lux index value $lux_{current}$ that is greater the lux index threshold $Th_L$ will not be used (based on the weight $w_i$ value of 0 for those frames) to determine the smoothed histogram $Hist_L$ for the current frame. In some cases, once the HDR metadata engine 708 determines that the difference between the current lux index $lux_{current}$ and the lux index $lux_i$ of a frame within the buffer in one search direction is greater (or equal to in some cases) than the lux index threshold $Th_L$, the HDR metadata engine 708 can treat that frame as a stop point and can stop searching in that particular direction.

The value of the lux index threshold $Th_L$ can be set to any suitable value that is indicative of a scene change. In some cases, the lux index threshold is a tunable parameter to control the type of luminance change that is acceptable. An example of a lux index threshold is as follows:

$$Th_L = lux_{current} \times \text{scene\_detect\_lux\_threshold}$$

where scene_detect_lux_threshold is the scene detection lux index threshold. In some examples, the scene_detect_lux_threshold can be a percentage (e.g., 50%, 60%, or other percentage). In one illustrative example, the lux index value $lux_{current}$ of the current frame can be 100 and the scene_detect_lux_threshold can be 50% (0.5), in which case the lux index threshold Th will be set to 50. In such an example, if the difference in lux index values of the current frame ($lux_{current}$) and a previous or subsequent frame ($lux_i$) is less than 50, the weight $w_i$ for previous or subsequent frame will be set to 1.

In some cases, as noted above, histogram smoothing can be performed based on a correlated color temperature (CCT) difference. For instance, a CCT can be indicative one or more automatic white balance (AWB) conditions per frame. A delta of CCT being larger than (or equal to in some cases) a CCT threshold can indicate a possible scene change. For instance, the HDR metadata engine 708 (e.g., HDR10+ lib) can search in two directions (e.g., starting at the current frame that is being encoded, such as current frame 902 of FIG. 9A) and can determine when a difference or delta of a CCT exceeds (or is equal to in some cases) the CCT threshold. For instance, when searching in each direction, the HDR metadata engine 708 can determine when a difference or delta of CCT values between two frames exceeds (or is equal to in some cases) the CCT threshold. In one example referring to FIG. 9A, when searching in the previous frame search direction 903, if the HDR metadata engine 708 determines that the difference in CCT values of frame 7 and frame 6 is greater than the CCT threshold, the HDR metadata engine 708 can determine that a stop point (e.g., defining a beginning of a scene cut) is present at frame 7. The HDR metadata engine 708 can perform a similar search in the post frame search direction 905 to identify another stop point (e.g., defining an end of a scene cut). Once the HDR metadata engine 708 determines that the difference or delta of the CCT values between the current frame and another frame in each search direction is greater than (or equal to in some cases) the CCT threshold, the HDR metadata engine 708 can stop searching and determine a smoothed histogram within the two stop points (or other number of stop points). An example of histogram smoothing performed based on CCT is as follows:

$$Hist_C = \frac{\sum hist_i \times w_i}{\sum w_i},$$

$$wi = \begin{cases} 1, & \text{abs}(cct_{current} - cct_i) < Th_C \\ 0, & \text{otherwise} \end{cases}.$$

Similar to the $Hist_L$ described above, $hist_i$ is the histogram of each frame in the buffer and $w_i$ is a weight (e.g., a value of 0 or 1, or a value between 0 and 1). The term $cct_{current}$ is the CCT value of the current frame, $cct_i$ is CCT value of each frame in the buffer, and $Th_C$ is the CCT threshold. For example, according to the $Hist_C$ equation above, if the difference between the current CCT value $cct_{current}$ and the CCT value $cct_i$ of one or more frames within the buffer is less than the CCT threshold $Th_C$, the weight $w_i$ will be set to 1. In such cases, the histograms $hist_i$ of the frames that have a CCT value within the CCT index threshold $Th_C$ of the current frame's CCT value CCT current will be used to determine a smoothed histogram $Hist_C$ for the current frame. Otherwise, if the difference between the current CCT $cct_{current}$ and the CCT value $cct_i$ of one or more frames within the buffer is greater (or equal to in some cases) than the CCT threshold $Th_C$, the weight $w_i$ will be set to 0. In such cases, the histograms $hist_i$ of the frames that have a CCT value difference from the current frame's CCT value $cct_{current}$ that is greater the CCT threshold $Th_C$ will not be used (based on the weight $w_i$ value of 0 for those frames) to determine the smoothed histogram $Hist_C$ for the current frame. In some cases, once the HDR metadata engine 708 determines that the difference between the current CCT value $cct_{current}$ and the CCT value $cct_i$ of a frame within the buffer in one search direction is greater (or equal to in some cases) than the CCT threshold $Th_C$, the HDR metadata engine 708 can treat that frame as a stop point and can stop searching in that particular direction.

The CCT threshold $Th_C$ value can be set to any suitable value that is indicative of a scene change. In some cases, the CCT threshold is a tunable parameter to control the type of CCT change that is acceptable. An example of a CCT threshold is as follows:

$$Th_C = cct_{current} \times \text{scene\_detect\_cct\_threshold}$$

where scene_detect_cct_threshold is the scene detection CCT threshold. In some examples, the scene_detect_cct_threshold can be a percentage (e.g., 50%, 60%, or other percentage). In one illustrative example, the CCT value $cct_{current}$ of the current frame can be 90 and the scene_detect_cct_threshold can be 60% (0.6). In such an example, the CCT threshold $Th_C$ will be set to 54. Continuing with the example, if the difference in CCT values of the current frame ($cct_{current}$) and a previous or subsequent frame ($cct_i$) is less than 54, the weight $w_i$ for previous or subsequent frame will be set to 1.

In some cases, as noted above, histogram smoothing can be performed based on a history histogram difference. For instance, a histogram provides image content per frame. A delta of histogram being larger than (or equal to in some cases) a histogram history threshold can indicate a possible scene change. For instance, the HDR metadata engine 708 (e.g., HDR10+ lib) can search in two directions (e.g., starting at the current frame that is being encoded, such as current frame 902 of FIG. 9A) and can determine when a difference or delta between one or more histograms (e.g., a histogram of a current frame being encoded and one or more histograms of one or more prior and/or subsequent frames) is greater than (or is equal to in some cases) the histogram history threshold. For example, when searching in each direction, the HDR metadata engine 708 can determine when a difference or delta of histogram values (e.g., an average of values within a histogram of a frame) between two frames exceeds (or is equal to in some cases) the histogram history threshold. In one example referring to FIG. 9A, when searching in the previous frame search direction 903, if the HDR metadata engine 708 determines that the difference in histogram values of frame 7 and frame 6 is greater than the histogram history threshold, the HDR metadata engine 708 can determine that a stop point (e.g., defining a beginning of a scene cut) is present at frame 7. The HDR metadata engine 708 can perform a similar search in the post frame search direction 905 to identify another stop point (e.g., defining an end of a scene cut). Once the HDR metadata engine 708 determines that the difference or delta between histogram values between the current frame and another frame in each search direction exceeds (or equal to in some cases) the histogram history threshold, the HDR metadata engine 708 can stop searching and determine a smoothed histogram within the two stop points (or other number of stop points). An example of histogram smoothing performed based on histogram history is as follows:

$$Hist_H = \frac{\sum hist_i \times w_i}{\sum w_i},$$

$$wi = \begin{cases} 1, & \text{abs}(hist_{current} - hist_i) < Th_H \\ 0, & \text{otherwise} \end{cases}.$$

Where $hist_i$ is a representative histogram value for each frame in the buffer (e.g., an average of histogram values of a frame), $w_i$ is a weight (e.g., a value of 0 or 1, or a value between 0 and 1), $hist_{current}$ is the histogram value of the current frame, $hist_i$ is histogram value of each frame in the buffer, and $Th_H$ is the histogram history threshold. For example, based on the $Hist_H$ equation above, if the difference between the histogram value hist current of the current frame and the histogram value $hist_i$ of one or more frames within the buffer is less than the histogram history threshold $Th_H$, the weight $w_i$ will be set to 1. In such cases, the histograms $hist_i$ of the frames that have a lux index value within the lux index threshold $Th_H$ of the current frame's histogram value $hist_{current}$ will be used to determine a smoothed histogram $Hist_H$ for the current frame. Otherwise, if the difference between the current histogram value hist current and the histogram value $hist_i$ of one or more frames within the buffer is greater (or equal to in some cases) than the histogram history threshold $Th_H$, the weight $w_i$ will be set to 0. In such cases, the histograms $hist_i$ of the frames that have a histogram value difference from the current frame's histogram value $hist_{current}$ that is greater the histogram history threshold Th will not be used (based on the weight $w_i$ value of 0 for those frames) to determine the smoothed histogram $Hist_H$ for the current frame. In some cases, once the HDR metadata engine 708 determines that the difference between the current histogram value hist current and the histogram value $hist_i$ of a frame within the buffer in one search direction is greater (or equal to in some cases) than the histogram history threshold $Th_H$, the HDR metadata engine 708 can treat that frame as a stop point and can stop search in that particular direction.

The histogram history threshold $Th_H$ value can be set to any suitable value that is indicative of a scene change. In some cases, the histogram history threshold is a tunable parameter to control the type of histogram change that is acceptable. An example of a histogram history threshold is as follows:

$$Th_H = \text{frame size} \times \text{scene\_detect\_hist\_threshold}$$

where scene_detect_hist_threshold is the scene detection histogram threshold. In some examples, the scene_detect_hist_threshold can be a percentage (e.g., 40%, 50%, 60%, or other percentage). In one illustrative example, the histogram value hist current of the current frame can be 200 and the scene_detect_hist_threshold can be 40% (0.4), in which case the histogram history threshold $Th_H$ will be set to 80. In such an example, if the difference in histogram values of the current frame ($hist_{current}$) and a previous or subsequent frame ($hist_i$) is less than 80, the weight $w_i$ for previous or subsequent frame will be set to 1.

In some cases, the HDR metadata engine 708 can determine a weighted-sum smoothed histogram for a current frame (e.g., a frame currently being encoded) based on a plurality of smoothed histograms. For instance, the HDR metadata engine 708 can determine the plurality of smoothed histograms for the frames within a scene cut based on a plurality of characteristics (e.g., lux index, CCT, histogram history, etc.) associated with the frames within the scene cut. The HDR metadata engine 708 can then determine a weighted-sum smoothed histogram as a weighted sum of the plurality of smoothed histograms. The HDR metadata engine 708 can then use the weighted-sum smoothed histogram to determine or calculate percentiles and/or a tone mapping curve (e.g., an opto-optical transfer function (OOTF) curve) for the current frame from the smoothed histogram.

In one illustrative example, the HDR metadata engine 708 can determine a weighted-sum smoothed histogram for a current frame based on a smoothed histogram determined for the current frame based lux index (e.g., denoted as $Hist_L$), a smoothed histogram determined for the current frame based on CCT (e.g., denoted as $Hist_C$), and a smoothed histogram determined for the current frame based on histogram history (e.g., denoted as $Hist_H$). An illustrative example of such a weighted-sum histogram can be determined by the HDR metadata engine 708 as follows:

$$FinalHist = \frac{w_L \times Hist_L + w_C \times Hist_C + w_H \times Hist_H}{w_L + w_C + w_H}$$

where w is a scene detection lux sensitivity (denoted as scene_detect_lux_sensitivity), $w_C$ is a scene detection CCT sensitivity (denoted as scene_detect_cct_sensitivity), and $w_H$ is a scene detection histogram sensitivity (denoted as scene_detect_hist_sensitivity).

In one illustrative example, scene_detect_lux_sensitivity can be set to 0.5, scene_detect_cct_sensitivity can be set to 0.3, and scene_detect_hist_sensitivity can be set to 0.2. Any other suitable values can be used for scene_detect_lux_sensitivity, scene_detect_cct_sensitivity, and scene_detect_hist_ sensitivity.

Using the scene cut detection and histogram smoothing techniques described herein can provide several benefits, including for example providing effective scene cut detection, providing stable image brightness among the frames within a detected scene cut (e.g., based on use of the lux index as described above), providing stable color behavior among the frames within the detected scene cut (e.g., based on use of the CCT as described above), and/or providing stable image content among the frames within the detected scene cut (e.g., based on use of the histogram history as described above). Such a technique thus does well considering image brightness, color, and content. Using such a scene cut detection and histogram smoothing technique can reduce or remove flickering due to sudden histogram changes, which can be dynamically adjusted for a given scene or item of media content (e.g., video) based on the configurable thresholds described above. Such a technique is also effective to reduce software costs. For instance, the system can use or share a same buffer for multiple scene cut detection and histogram smoothing techniques (e.g., use the same buffered frames for the three different scene cut detection and histogram smoothing schemes described above based on lux index, CCT, and histogram history), which can avoid the use of multiple buffers for the different scene cut detection and histogram smoothing techniques. The scene cut detection and histogram smoothing techniques are also effective for tuning. For instance, only a few tuning parameters need to be tuned to achieve particular user preferences.

Figure 9B:
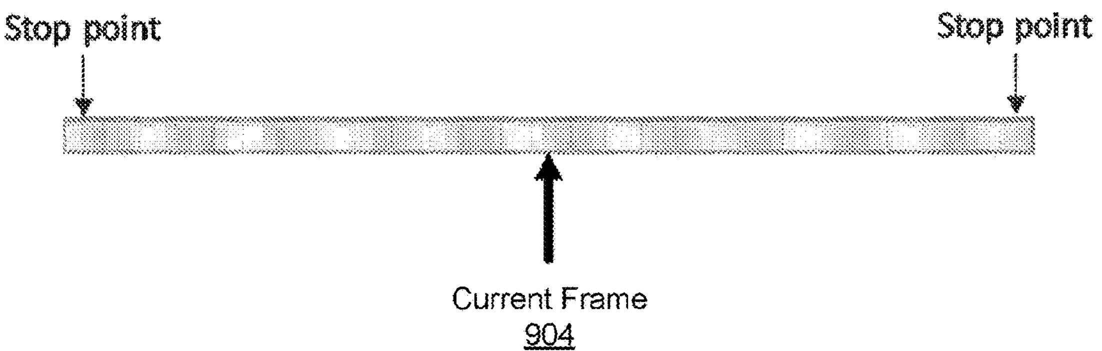
FIG. 9B and FIG. 9C are diagram illustrating an example of stopping points that can be used for histogram smoothing, in accordance with some examples.
Figure 9C:
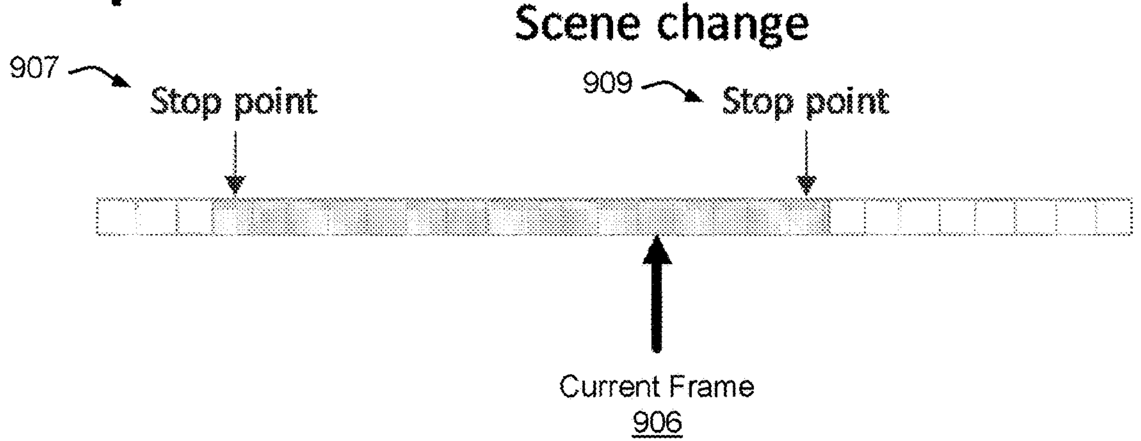

FIG. 9B and FIG. 9C are diagrams illustrating examples of stopping points (e.g., beginning points and ending points) that can define a scene cut, which can be used for histogram smoothing as described herein. FIG. 9B illustrates an example of a stable scene, where a scene change does not occur (e.g., when the camera capturing the scene is not moving). In such an example, all 31 frames stored in the buffer 720 can be used to smooth the histogram for a current frame 904. Further, it is noted that the stop points shown in FIG. 9B may not refer to an actual scene boundary, as a scene within the video may include more frames than are in the buffer. FIG. 9C illustrates an example of a scene that has a scene change (or scene cut). The stop points 907 and 909 that define the scene cut relative to a current frame 906 can be identified using the characteristic based search described above (e.g., based on lux indexes, CCTs, and/or histograms) of the frames within the scene cut.

Figure 10:
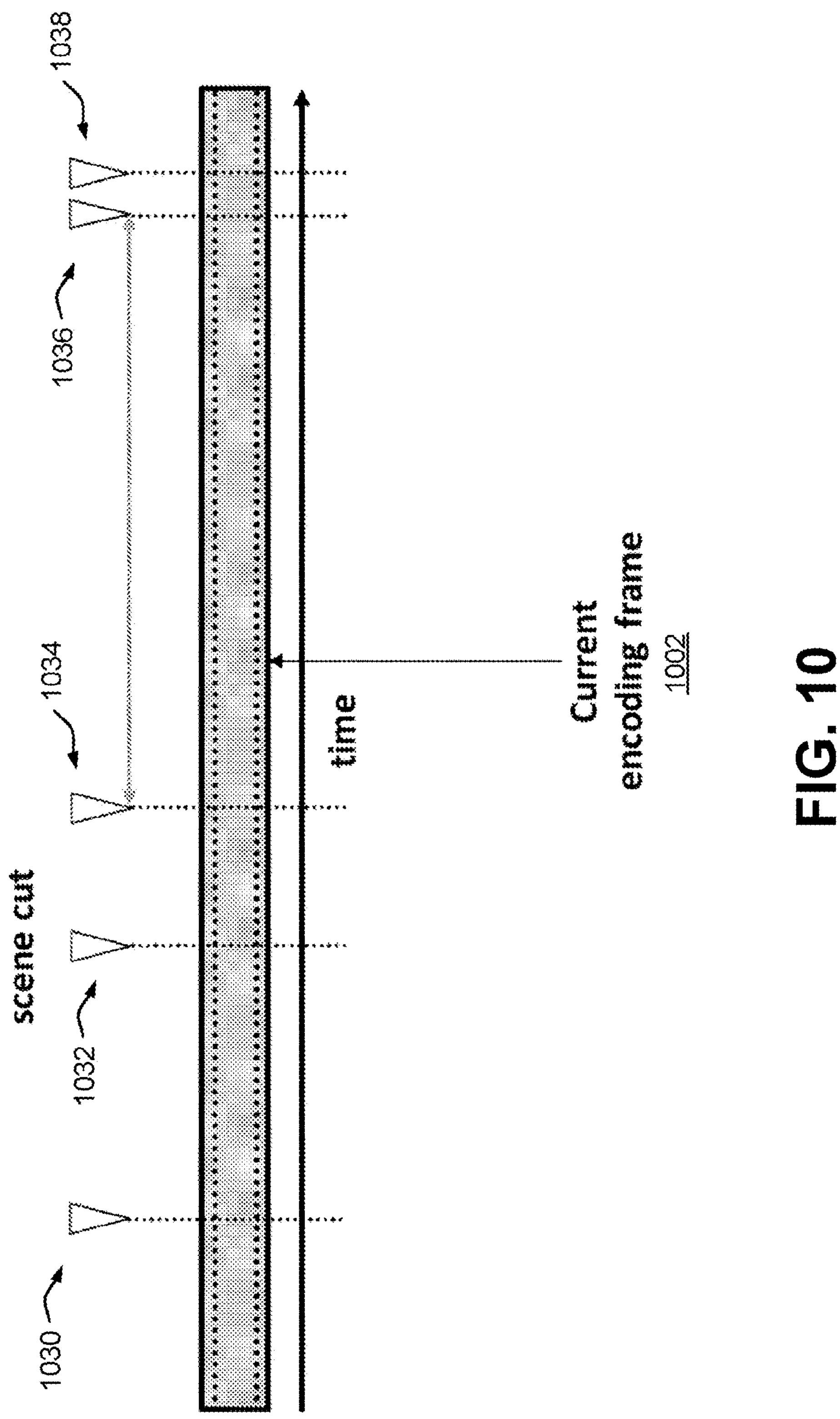
FIG. 10 is a diagram illustrating an example of a scene cut and a current encoding frame, in accordance with some examples.

The scene cut detection and smoothing techniques described herein can be used to detect multiple scene cuts within an item of media content (e.g., a video) and determine a smoothed histogram for the frames within each scene cut. FIG. 10 is a diagram illustrating an example of a plurality of scene cuts detected within an item of content (e.g., a video). A current encoding frame 1002 is shown within one scene cut defined by a beginning point 1034 and an ending point 1036. Multiple other scene cuts are shown, including a scene cut defined by a beginning point 1030 and an ending point 1032. A beginning point 1038 of another scene cut is also shown.

In some examples, the systems and techniques described herein can be used for determining short frame transients (e.g., 1 or 2 frame transients), such as flash frames. For instance, in an indoor setting and due to one or more other cameras' flashes or other brightness, the scene brightness and/or color composition may suddenly and for very brief time intervals (e.g., 1 or 2 video frames) change significantly and then recover back to the pre-flash state. Across these transients, it may not be beneficial to drastically alter the historical histogram. In such cases, the systems and techniques described above may not stop at potential discontinuity points (e.g., at detected scene cuts), and instead may continue to analyze frames beyond the discontinuity for a more complete assessment.

Figure 11:
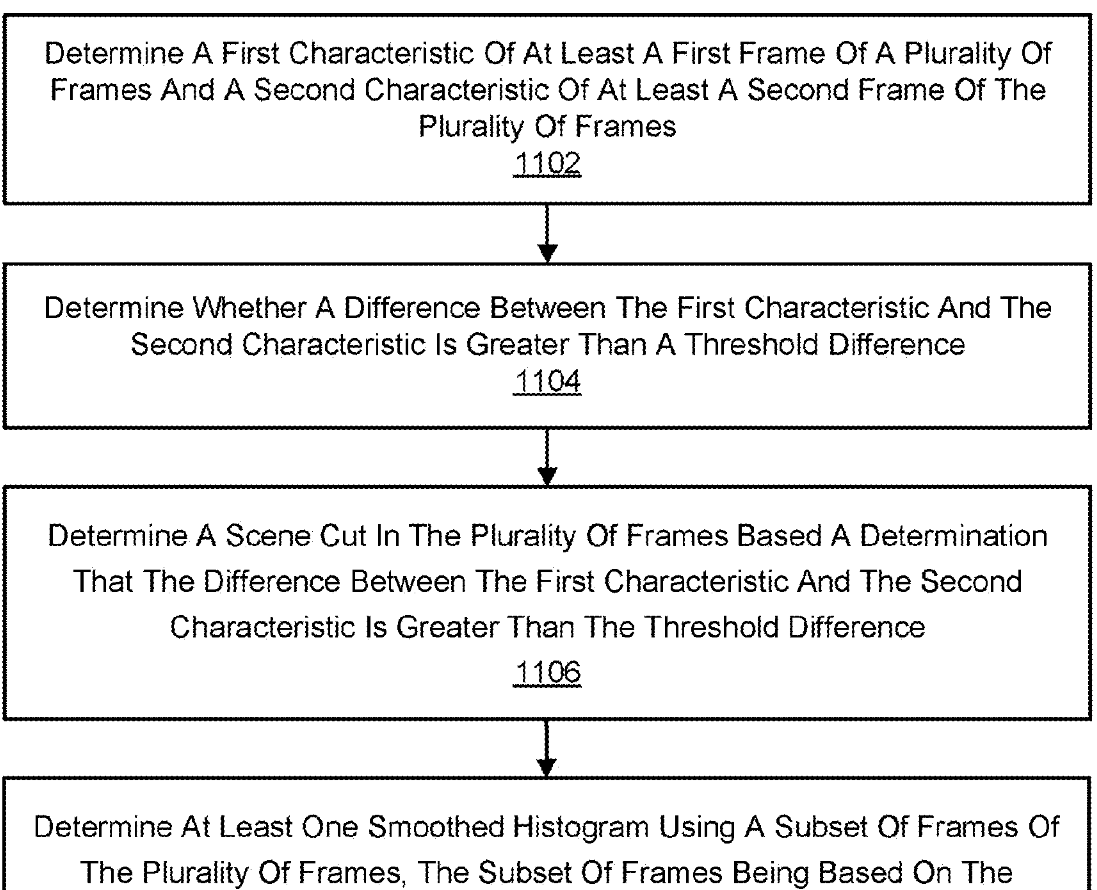
FIG. 11 is a flow diagram illustrating an example of a process of processing video data, in accordance with some examples.

FIG. 11 is a diagram illustrating an example of a process 1100 of processing video data, in accordance with some examples. At block 1102, the process 1100 includes determining a first characteristic of at least a first frame of a plurality of frames and a second characteristic of at least a second frame of the plurality of frames. In some cases, the first frame of the plurality of frames is a frame currently being encoded. In some aspects, the first characteristic includes a first lux index of at least the first frame and the second characteristic include a second lux index of at least the second frame. In some aspects, the first characteristic includes a first correlated color temperature (CCT) of at least the first frame and the second characteristic include a second CCT of at least the second frame. In some aspects, the first characteristic includes a first histogram of at least the first frame and the second characteristic include a second histogram of at least the second frame. Any other characteristics of the first frame and second frame (and/or other frames) can be determined.

At block 1104, the process 1100 includes determining whether a difference between the first characteristic and the second characteristic is greater than a threshold difference. For instance, in some cases, the process 1100 can include determining a first lux index of at least the first frame and determining a second lux index of at least the second frame. In such cases, the process 1100 can include determining that a difference between the first lux index and the second lux index is greater than a lux index threshold. Additionally or alternatively, in some examples, the process 1100 can include determining a first correlated color temperature (CCT) of at least the first frame and determining a second CCT of at least the second frame. In such cases, the process 1100 can include determining that a difference between the first CCT and the second CCT is greater than a CCT threshold. Additionally or alternatively, in some aspects, the process 1100 can include determining a first histogram of at least the first frame and determining a second histogram of at least the second frame. In such aspects, the process 1100 can include determining that a difference between the first histogram and the second histogram is greater than a histogram history threshold.

In some examples, the process 1100 can include, starting from a current frame of the plurality of frames, searching in a first direction (e.g., in the previous frame search direction 903 of FIG. 9A) until it is determined that a difference between the first characteristic of the first frame and the second characteristic of the second frame is greater than the threshold difference. In such examples, the process 1100 can include determining the first frame as a beginning of the scene cut. The process 1100 can further include, starting from the current frame of the plurality of frames, searching in a second direction (e.g., in the post frame search direction 905 of FIG. 9A) until it is determined that a difference between a third characteristic of a third frame and a fourth characteristic of a fourth frame is greater than the threshold difference. The process 1100 can include determining the third frame as an end of the scene cut. In some cases, the subset of frames includes frames of the plurality of frames between the first frame and the third frame.

At block 1106, the process 1100 includes determining a scene cut in the plurality of frames based a determination that the difference between the first characteristic and the second characteristic is greater than the threshold difference.

At block 1108, the process 1100 includes determining at least one smoothed histogram using a subset of frames of the plurality of frames, the subset of frames being based on the determined scene cut.

In some cases, as noted above, to determine the scene cut in the plurality of frames, the process 1100 can include: determining a first lux index of at least the first frame and a second lux index of at least the second frame; determining whether a difference between the first lux index and the second lux index is greater than a lux index threshold; and determining the scene cut based a determination that the difference between the first lux index and the second lux index is greater than the lux index threshold. In some aspects, to determine the smoothed histogram based on the determined scene cut, the process 1100 can include determining a first smoothed histogram based on at least a first histogram of at least the first frame and a second histogram of at least the second frame. In one illustrative example, the first smoothed histogram can be determined as follows:

$$Hist_L = \frac{\sum hist_i \times w_i}{\sum w_i},$$

-continued $$wi = \begin{cases} 1, & \text{abs}(lux_{current} - lux_i) < Th_L \\ 0, & \text{otherwise} \end{cases}.$$

In some aspects, as noted above, to determine the scene cut in the plurality of frames, the process 1100 can include: determining a first correlated color temperature (CCT) of at least the first frame and a second CCT of at least the second frame; determining whether a difference between the first CCT and the second CCT is greater than a CCT threshold; and determining the scene cut based a determination that the difference between the first CCT and the second CCT is greater than the CCT threshold. In some aspects, to determine the smoothed histogram based on the determined scene cut, the process 1100 can include determining a second smoothed histogram based on at least a first histogram of at least the first frame and a second histogram of at least the second frame. In one illustrative example, the second smoothed histogram can be determined as follows:

$$Hist_C = \frac{\sum hist_i \times w_i}{\sum w_i},$$

$$wi = \begin{cases} 1, & \text{abs}(cct_{current} - cct_i) < Th_C \\ 0, & \text{otherwise} \end{cases}.$$

In some aspects, as noted above, to determine the scene cut in the plurality of frames, the process 1100 can include: determining a first histogram of at least the first frame and a second histogram of at least the second frame; determining whether a difference between the first histogram and the second histogram is greater than a histogram history threshold; and determining the scene cut based a determination that the difference between the first histogram and the second histogram is greater than the histogram history threshold. In some aspects, to determine the smoothed histogram based on the determined scene cut, the process 1100 can include determining a third smoothed histogram based on at least the first histogram of at least the first frame and the second histogram of at least the second frame. In one illustrative example, the third smoothed histogram can be determined as follows:

$$Hist_H = \frac{\sum hist_i \times w_i}{\sum w_i},$$

$$wi = \begin{cases} 1, & \text{abs}(hist_{current} - hist_i) < Th_H \\ 0, & \text{otherwise} \end{cases}.$$

In some aspects, to determine the at least one smoothed histogram based on the determined scene cut, the process 1100 can include determining a plurality of smoothed histograms for the subset of frames based on a plurality of characteristics associated with the subset of frames, and determining the at least one smoothed histogram as a weighted sum of the plurality of smoothed histograms. For instance, the process 1100 can include determining a weighted sum of at least the first smoothed histogram, the second smoothed histogram, and the third smoothed histogram. In one illustrative example, a final histogram can be determined as the weighted sum as follows:

$$FinalHist = \frac{w_L \times Hist_L + w_C \times Hist_C + w_H \times Hist_H}{w_L + w_C + w_H}$$

where $w_L$ is scene_detect_lux_sensitivity, $w_C$ is scene_detect_cct_sensitivity, and $w_H$ is scene_detect_hist_sensitivity.

In some examples, the process 1100 can include storing the plurality of frames in a buffer. An example of such a buffer is shown in FIG. 7. In some examples, the process 1100 can include generating dynamic metadata (e.g., HDR10+ dynamic metadata) including the at least one smoothed histogram. In some cases, the process 1100 can include sending the dynamic metadata to a video encoder. The video encoder can encode the video data (including the plurality of frames) and can store the encoded video with the dynamic metadata and/or send the encoded video with the dynamic metadata to another device.

In some implementations, the processes (or methods) described herein (e.g., the process 1100 and/or other processes described herein) can be performed by a computing system, device, or apparatus, such as the system 700 of FIG. 7, the HDR metadata engine 708 of the system 700 of FIG. 7, or other system or device. For example, the processes can be performed by the HDR metadata engine 708 of the system 700 of FIG. 7 or by another system or device, such as a player device, a display, or any other client-side device. In some cases, the computing device or apparatus may include a processor, microprocessor, microcomputer, or other component of a device that is configured to carry out the steps of the processes described herein. In some examples, the computing device or apparatus may include a camera configured to capture video data (e.g., a video sequence) including video frames. In some examples, a camera or other capture device that captures the video data is separate from the computing device, in which case the computing device receives or obtains the captured video data. The computing device may further include a network interface configured to communicate the video data. The network interface may be configured to communicate Internet Protocol (IP) based data or other type of data. In some examples, the computing device or apparatus may include a display for displaying output video content, such as samples of pictures of a video bitstream.

The components of the computing system, device, and/or apparatus can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

In some aspects, the system, device, or apparatus can include means for obtaining a plurality of frames, means for determining a scene cut in the plurality of frames, and means for determining a smoothed histogram based on the determined scene cut. In some examples, the means for obtaining a plurality of frames, the means for determining a scene cut in the plurality of frames, and the means for determining a smoothed histogram based on the determined scene cut can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

The process 1100 and/or other processes described herein are described with respect to logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., process 1100 and/or other processes described herein) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

In addition to the aspects described above, it will be apparent that additional aspects are possible within the scope of the details provided herein. For example, repeated operations or intervening operations are possible within the scope of processes 1100 and/or other processes described herein and related processes. Additional variations on the above processes will also be apparent from the details described herein.

The techniques discussed herein may be implemented in an example video processing, encoding, and/or decoding system. In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. The connection can include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and an output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 12:
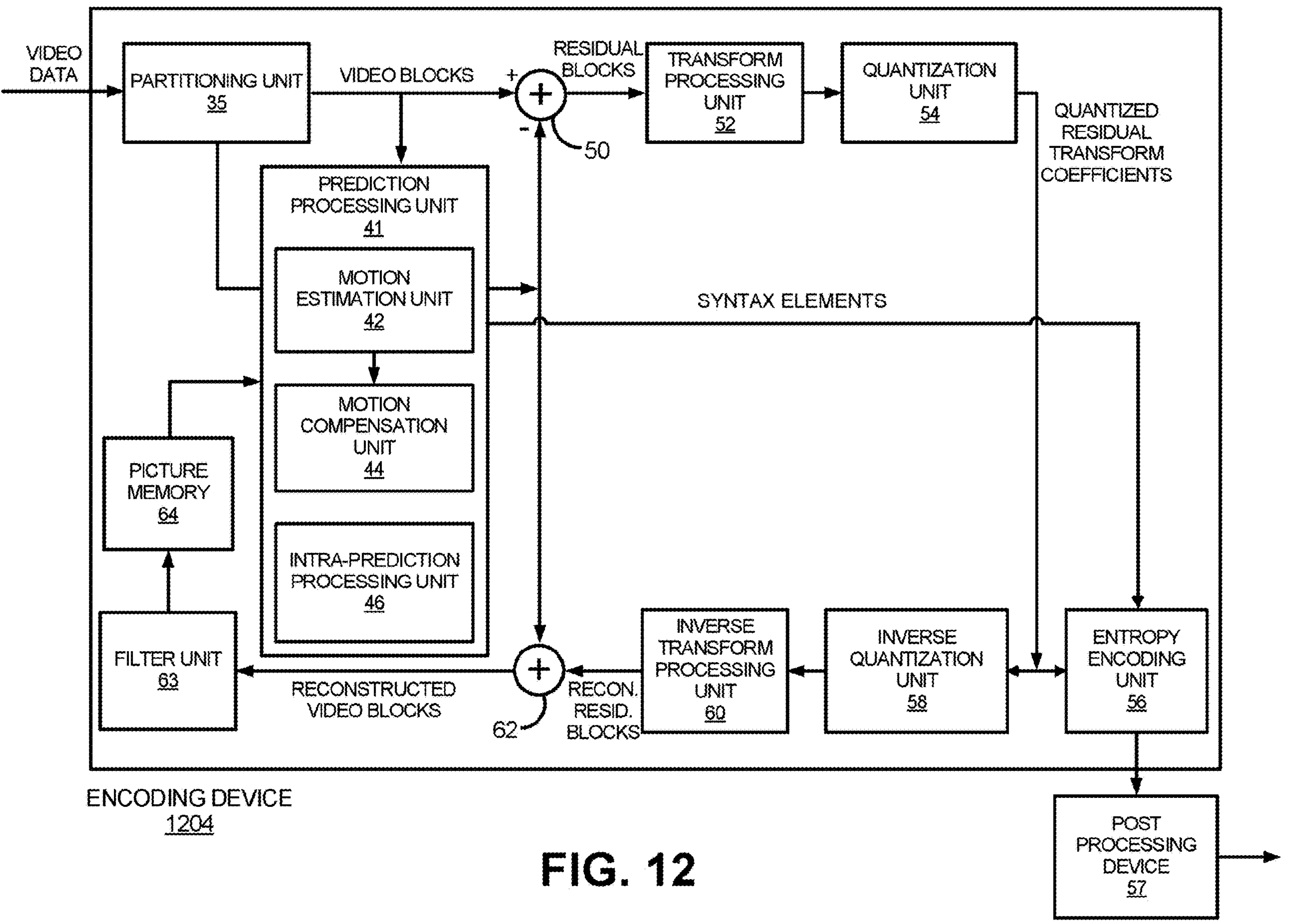
FIG. 12 is a block diagram illustrating an example video encoding device, in accordance with some examples.
Figure 13:
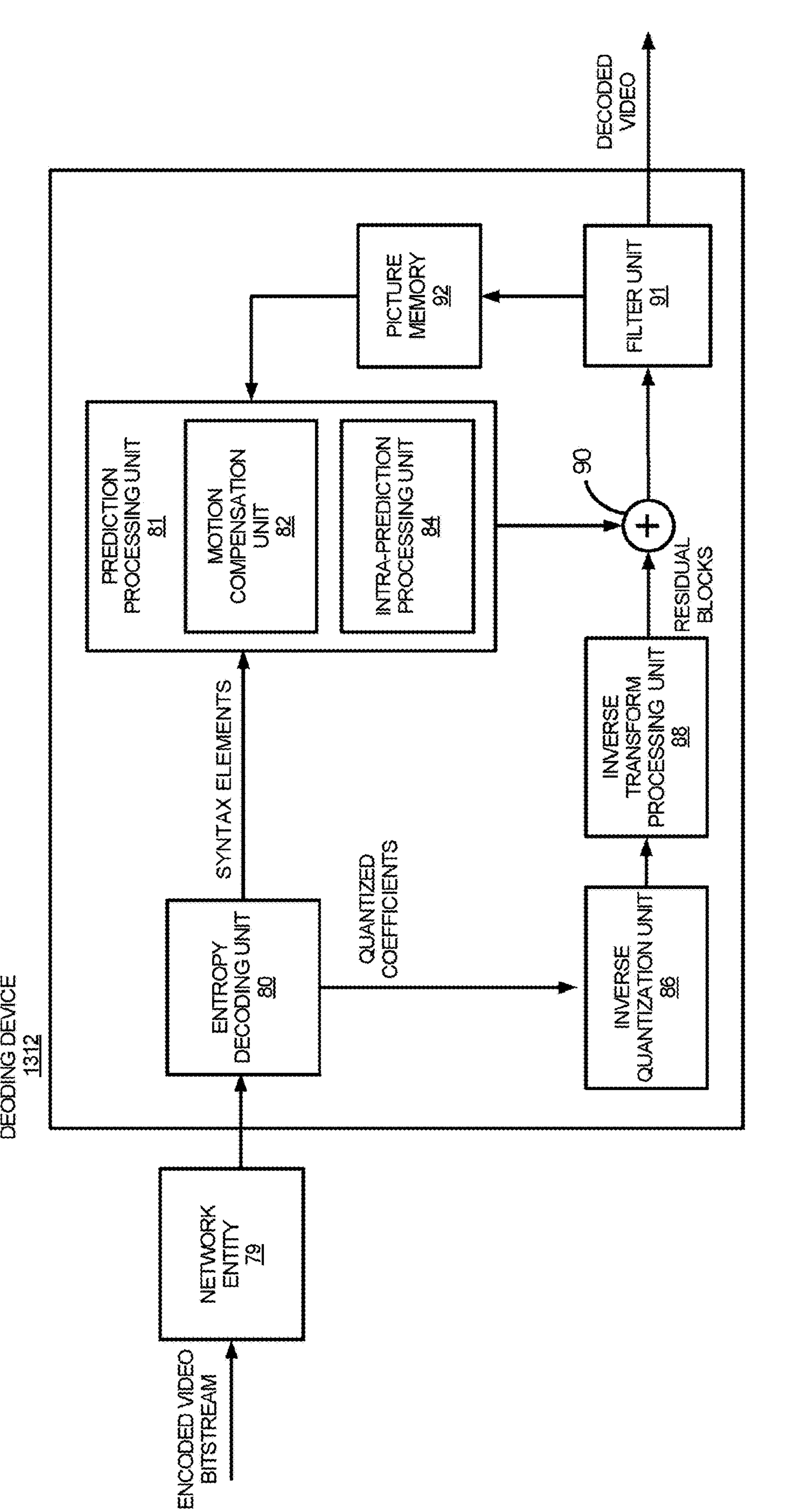
FIG. 13 is a block diagram illustrating an example video decoding device, in accordance with some examples.

FIG. 12 is a block diagram illustrating an example encoding device 1204 that may implement one or more of the techniques described in this disclosure. Encoding device 1204 may, for example, generate the syntax structures described herein (e.g., the syntax structures of a video parameter set (VPS), sequence parameter set (SPS), picture parameter set (PPS), or other syntax elements). Encoding device 1204 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 1204 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 1204 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 12 as being an in loop filter, in other configurations, filter unit 63 may be implemented as a post loop filter. A post processing device 57 may perform additional processing on encoded video data generated by the encoding device 1204. The techniques of this disclosure may in some instances be implemented by the encoding device 1204. In other instances, however, one or more of the techniques of this disclosure may be implemented by post processing device 57.

As shown in FIG. 12, the encoding device 1204 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 1204 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 1204 may calculate values for sub-integer pixel positions of reference pictures stored in picture memory 64. For example, the encoding device 1204 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 1204 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 1312 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing unit 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 1204 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 1204 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 1312, or archived for later transmission or retrieval by the decoding device 1312. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 1204 of FIG. 12 represents an example of a video encoder configured to perform any of the techniques described herein, including the any of the processes or techniques described above. In some cases, some of the techniques of this disclosure may also be implemented by post processing device 57.

FIG. 14 is a block diagram illustrating an example decoding device 1312. The decoding device 1312 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 1312 may, in some examples, perform a decoding pass generally reciprocal to the encoding pass described with respect to the encoding device 1204 from FIG. 12.

During the decoding process, the decoding device 1312 receives an encoded video bitstream that represents video blocks of an encoded video slice and associated syntax elements sent by the encoding device 1204. In some embodiments, the decoding device 1312 may receive the encoded video bitstream from the encoding device 1204. In some embodiments, the decoding device 1312 may receive the encoded video bitstream from a network entity 79, such as a server, a media-aware network element (MANE), a video editor/splicer, or other such device configured to implement one or more of the techniques described above. Network entity 79 may or may not include the encoding device 1204. Some of the techniques described in this disclosure may be implemented by network entity 79 prior to network entity 79 transmitting the encoded video bitstream to the decoding device 1312. In some video decoding systems, network entity 79 and the decoding device 1312 may be parts of separate devices, while in other instances, the functionality described with respect to network entity 79 may be performed by the same device that comprises the decoding device 1312.

The entropy decoding unit 80 of the decoding device 1312 entropy decodes the bitstream to generate quantized coefficients, motion vectors, and other syntax elements. Entropy decoding unit 80 forwards the motion vectors and other syntax elements to prediction processing unit 81. The decoding device 1312 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 1312 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 1204 during encoding of the video blocks to calculate interpolated values for sub-integer pixels of reference blocks. In this case, motion compensation unit 82 may determine the interpolation filters used by the encoding device 1204 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 1204 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 1312 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 14 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device.

In this manner, the decoding device 1312 of FIG. 14 represents an example of a video decoder configured to perform any of the techniques described herein, including the processes or techniques described above.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure are provided as follows:

Aspect 1. An apparatus for processing video data, comprising: a memory; and a processor coupled to the memory and configured to: obtain a plurality of frames; determine a scene cut in the plurality of frames; and determine a smoothed histogram based on the determined scene cut.

Aspect 2. The apparatus of aspect 1, wherein, to determine the scene cut in the plurality of frames, the processor is configured to: determine a first characteristic of at least a first frame of the plurality of frames and a second characteristic of at least a second frame of the plurality of frames; determine whether a difference between the first characteristic and the second characteristic is greater than a threshold difference; and determine the scene cut based a determination that the difference between the first characteristic and the second characteristic is greater than the threshold difference.

Aspect 3. The apparatus of any one of aspects 1 or 2, wherein, to determine the scene cut in the plurality of frames, the processor is configured to: starting from a current frame, search in two directions until determining that difference between the first characteristic and the second characteristic is greater than the threshold difference.

Aspect 4. The apparatus of any one of aspects 1 to 3, wherein the first characteristic includes a first lux index of at least the first frame and the second characteristic include a second lux index of at least the second frame.

Aspect 5. The apparatus of any one of aspects 1 to 3, wherein the first characteristic includes a first correlated color temperature (CCT) of at least the first frame and the second characteristic include a second CCT of at least the second frame.

Aspect 6. The apparatus of any one of aspects 1 to 3, wherein the first characteristic includes a first histogram of at least the first frame and the second characteristic include a second histogram of at least the second frame.

Aspect 7. The apparatus of aspect 1, wherein, to determine the scene cut in the plurality of frames, the processor is configured to: determine a first lux index of at least a first frame of the plurality of frames and a second characteristic of at least a second frame of the plurality of frames; determine whether a difference between the first lux index and the second lux index is greater than a lux index threshold; and determine the scene cut based a determination that the difference between the first lux index and the second lux index is greater than the lux index threshold.

Aspect 8. The apparatus of aspect 7, wherein, to determine the smoothed histogram based on the determined scene cut, the processor is configured to: determine a first smoothed histogram based on at least a first histogram of at least the first frame and a second histogram of at least the second frame.

Aspect 9. The apparatus of any one of aspects 1, 7, or 8, wherein, to determine the scene cut in the plurality of frames, the processor is configured to: determine a first correlated color temperature (CCT) of at least a first frame of the plurality of frames and a second CCT of at least a second frame of the plurality of frames; determine whether a difference between the first CCT and the second CCT is greater than a CCT threshold; and determine the scene cut based a determination that the difference between the first CCT and the second CCT is greater than the CCT threshold.

Aspect 10. The apparatus of aspect 9, wherein, to determine the smoothed histogram based on the determined scene cut, the processor is configured to: determine a second smoothed histogram based on at least a first histogram of at least the first frame and a second histogram of at least the second frame.

Aspect 11. The apparatus of any one of aspects 1 or 7 to 10, wherein, to determine the scene cut in the plurality of frames, the processor is configured to: determine a first histogram of at least the first frame of the plurality of frames and a second histogram of at least the second frame of the plurality of frames; determine whether a difference between the first histogram and the second histogram is greater than a histogram history threshold; and determine the scene cut based a determination that the difference between the first histogram and the second histogram is greater than the histogram history threshold.

Aspect 12. The apparatus of aspect 11, wherein, to determine the smoothed histogram based on the determined scene cut, the processor is configured to: determine a third smoothed histogram based on at least the first histogram of at least the first frame and the second histogram of at least the second frame.

Aspect 13. The apparatus of any one of aspects 1 or 7 to 12, wherein, to determine the smoothed histogram based on the determined scene cut, the processor is configured to: determine a weighted sum of at least the first smoothed histogram, the second smoothed histogram, and the third smoothed histogram.

Aspect 14. The apparatus of any one of aspects 1 to 13, wherein the processor is further configured to: store the plurality of frames in a buffer.

Aspect 15. The apparatus of any one of aspects 1 to 14, wherein the processor is further configured to: generate dynamic metadata including the smoothed histogram.

Aspect 16. The apparatus of any one of aspects 1 to 15, wherein the processor is further configured to: send the dynamic metadata to a video encoder.

Aspect 17. The apparatus of any one of aspects 1 to 16, wherein the apparatus comprises a mobile device.

Aspect 18. The apparatus of any one of aspects 1 to 17, further comprising a display coupled to the processor.

Aspect 19. The apparatus of any one of aspects 1 to 18, further comprising a camera configured to capture one or more frames.

Aspect 20. A method of processing video data, the method comprising: obtaining a plurality of frames; determining a scene cut in the plurality of frames; and determining a smoothed histogram based on the determined scene cut.

Aspect 21. The method of aspect 20, wherein determining the scene cut in the plurality of frames includes: determining a first characteristic of at least a first frame of the plurality of frames and a second characteristic of at least a second frame of the plurality of frames; determining whether a difference between the first characteristic and the second characteristic is greater than a threshold difference; and determining the scene cut based a determination that the difference between the first characteristic and the second characteristic is greater than the threshold difference.

Aspect 22. The method of any one of aspects 20 to 21, wherein determining the scene cut in the plurality of frames includes: starting from a current frame, searching in two directions until determining that difference between the first characteristic and the second characteristic is greater than the threshold difference.

Aspect 23. The method of any one of aspects 20 to 22, wherein the first characteristic includes a first lux index of at least the first frame and the second characteristic include a second lux index of at least the second frame.

Aspect 24. The method of any one of aspects 20 to 22, wherein the first characteristic includes a first correlated color temperature (CCT) of at least the first frame and the second characteristic include a second CCT of at least the second frame.

Aspect 25. The method of any one of aspects 20 to 22, wherein the first characteristic includes a first histogram of at least the first frame and the second characteristic include a second histogram of at least the second frame.

Aspect 26. The method of aspect 20, wherein determining the scene cut in the plurality of frames includes: determining a first lux index of at least a first frame of the plurality of frames and a second characteristic of at least a second frame of the plurality of frames; determining whether a difference between the first lux index and the second lux index is greater than a lux index threshold; and determining the scene cut based a determination that the difference between the first lux index and the second lux index is greater than the lux index threshold.

Aspect 27. The method of aspect 26, wherein determining the smoothed histogram based on the determined scene cut includes: determining a first smoothed histogram based on at least a first histogram of at least the first frame and a second histogram of at least the second frame.

Aspect 28. The method of any one of aspects 20, 26, or 27, wherein determining the scene cut in the plurality of frames includes: determining a first correlated color temperature (CCT) of at least a first frame of the plurality of frames and a second CCT of at least a second frame of the plurality of frames; determining whether a difference between the first CCT and the second CCT is greater than a CCT threshold; and determining the scene cut based a determination that the difference between the first CCT and the second CCT is greater than the CCT threshold.

Aspect 29. The method of aspect 28, wherein determining the smoothed histogram based on the determined scene cut includes: determining a second smoothed histogram based on at least a first histogram of at least the first frame and a second histogram of at least the second frame.

Aspect 30. The method of any one of aspects 20 or 26 to 29, wherein determining the scene cut in the plurality of frames includes: determining a first histogram of at least the first frame of the plurality of frames and a second histogram of at least the second frame of the plurality of frames; determining whether a difference between the first histogram and the second histogram is greater than a histogram history threshold; and determining the scene cut based a determination that the difference between the first histogram and the second histogram is greater than the histogram history threshold.

Aspect 31. The method of aspect 30, wherein determining the smoothed histogram based on the determined scene cut includes: determining a third smoothed histogram based on at least the first histogram of at least the first frame and the second histogram of at least the second frame.

Aspect 32. The method of any one of aspects 20 or 7 to 31, wherein determining the smoothed histogram based on the determined scene cut includes: determining a weighted sum of at least the first smoothed histogram, the second smoothed histogram, and the third smoothed histogram.

Aspect 33. The method of any one of aspects 20 to 32, further comprising: storing the plurality of frames in a buffer.

Aspect 34. The method of any one of aspects 20 to 33, further comprising: generating dynamic metadata including the smoothed histogram.

Aspect 35. The method of any one of aspects 20 to 34, further comprising: sending the dynamic metadata to a video encoder.

Aspect 36. A non-transitory computer-readable medium having stored thereon instructions that, when executed by one or more processors, cause the one or more processors to perform the operations of any one of aspects 1 to 35.

Aspect 37. An apparatus for determining one or more environmental layouts, comprising means for performing the operations of any one of aspects 1 to 35.

Aspect 38. An apparatus for processing video data, comprising: at least one memory; and at least one processor coupled to the at least one memory, the at least one processor configured to: determine a first characteristic of at least a first frame of a plurality of frames and a second characteristic of at least a second frame of the plurality of frames; determine whether a difference between the first characteristic and the second characteristic is greater than a threshold difference; determine a scene cut in the plurality of frames based a determination that the difference between the first characteristic and the second characteristic is greater than the threshold difference; and determine at least one smoothed histogram using a subset of frames of the plurality of frames, the subset of frames being based on the determined scene cut.

Aspect 39. The apparatus of aspect 38, wherein the at least one processor is configured to: starting from a current frame of the plurality of frames, search in a first direction until it is determined that a difference between the first characteristic of the first frame and the second characteristic of the second frame is greater than the threshold difference; determining the first frame as a beginning of the determined scene cut; starting from the current frame of the plurality of frames, search in a second direction until it is determined that a difference between a third characteristic of a third frame and a fourth characteristic of a fourth frame is greater than the threshold difference; and determining the third frame as an end of the determined scene cut.

Aspect 40. The apparatus of aspect 39, wherein the subset of frames includes frames of the plurality of frames between the first frame and the third frame.

Aspect 41. The apparatus of any one of aspects 38 to 40, wherein the first characteristic includes a first lux index of at least the first frame and the second characteristic include a second lux index of at least the second frame.

Aspect 42. The apparatus of any one of aspects 38 to 41, wherein the first characteristic includes a first correlated color temperature (CCT) of at least the first frame and the second characteristic include a second CCT of at least the second frame.

Aspect 43. The apparatus of any one of aspects 38 to 42, wherein the first characteristic includes a first histogram of at least the first frame and the second characteristic include a second histogram of at least the second frame.

Aspect 44. The apparatus of any one of aspects 38 to 43, wherein: to determine the first characteristic of at least the first frame, the at least one processor is configured to determine a first lux index of at least the first frame; to determine the second characteristic of at least the second frame, the at least one processor is configured to determine a second lux index of at least the second frame; and to determine that the difference between the first characteristic and the second characteristic is greater than the threshold difference, the at least one processor is configured to determine that a difference between the first lux index and the second lux index is greater than a lux index threshold.

Aspect 45. The apparatus of any one of aspects 38 to 44, wherein: to determine the first characteristic of at least the first frame, the at least one processor is configured to determine a first correlated color temperature (CCT) of at least the first frame; to determine the second characteristic of at least the second frame, the at least one processor is configured to determine a second CCT of at least the second frame; and to determine that the difference between the first characteristic and the second characteristic is greater than the threshold difference, the at least one processor is configured to determine that a difference between the first CCT and the second CCT is greater than a CCT threshold.

Aspect 46. The apparatus of any one of aspects 38 to 45, wherein: to determine the first characteristic of at least the first frame, the at least one processor is configured to determine a first histogram of at least the first frame; to determine the second characteristic of at least the second frame, the at least one processor is configured to determine a second histogram of at least the second frame; and to determine that the difference between the first characteristic and the second characteristic is greater than the threshold difference, the at least one processor is configured to determine that a difference between the first histogram and the second histogram is greater than a histogram history threshold.

Aspect 47. The apparatus of any one of aspects 38 to 46, wherein, to determine the at least one smoothed histogram based on the determined scene cut, the at least one processor is configured to: determine a plurality of smoothed histograms for the subset of frames based on a plurality of characteristics associated with the subset of frames; and determine the at least one smoothed histogram as a weighted sum of the plurality of smoothed histograms.

Aspect 48. The apparatus of any one of aspects 38 to 47, wherein the first frame of the plurality of frames is a frame currently being encoded.

Aspect 49. The apparatus of any one of aspects 38 to 48, wherein the at least one processor is further configured to: store the plurality of frames in a buffer.

Aspect 50. The apparatus of any one of aspects 38 to 49, wherein the at least one processor is further configured to: generate dynamic metadata including the at least one smoothed histogram.

Aspect 51. The apparatus of aspect 50, wherein the at least one processor is further configured to: send the dynamic metadata to a video encoder.

Aspect 52. The apparatus of any one of aspects 38 to 51, wherein the apparatus comprises a mobile device.

Aspect 53. The apparatus of any one of aspects 38 to 52, further comprising at least one of a display and a camera configured to capture one or more frames.

Aspect 54. A method of processing video data, comprising: determining a first characteristic of at least a first frame of a plurality of frames and a second characteristic of at least a second frame of the plurality of frames; determining whether a difference between the first characteristic and the second characteristic is greater than a threshold difference; determining a scene cut in the plurality of frames based a determination that the difference between the first characteristic and the second characteristic is greater than the threshold difference; and determining at least one smoothed histogram using a subset of frames of the plurality of frames, the subset of frames being based on the determined scene cut.

Aspect 55. The method of aspect 54, further comprising: starting from a current frame of the plurality of frames, searching in a first direction until it is determined that a difference between the first characteristic of the first frame and the second characteristic of the second frame is greater than the threshold difference; determining the first frame as a beginning of the determined scene cut; starting from the current frame of the plurality of frames, searching in a second direction until it is determined that a difference between a third characteristic of a third frame and a fourth characteristic of a fourth frame is greater than the threshold difference; and determining the third frame as an end of the determined scene cut.

Aspect 56. The method of aspect 55, wherein the subset of frames includes frames of the plurality of frames between the first frame and the third frame.

Aspect 57. The method of any one of aspects. 54 to 56, wherein the first characteristic includes a first lux index of at least the first frame and the second characteristic include a second lux index of at least the second frame.

Aspect 58. The method of any one of aspects 54 to 57, wherein the first characteristic includes a first correlated color temperature (CCT) of at least the first frame and the second characteristic include a second CCT of at least the second frame.

Aspect 59. The method of any one of aspects 54 to 58, wherein the first characteristic includes a first histogram of at least the first frame and the second characteristic include a second histogram of at least the second frame.

Aspect 60. The method of any one of aspects 54 to 59, wherein: determining the first characteristic of at least the first frame includes determining a first lux index of at least the first frame; determining the second characteristic of at least the second frame includes determining a second lux index of at least the second frame; and determining that the difference between the first characteristic and the second characteristic is greater than the threshold difference includes determining that a difference between the first lux index and the second lux index is greater than a lux index threshold.

Aspect 61. The method of any one of aspects 54 to 60, wherein: determining the first characteristic of at least the first frame includes determining a first correlated color temperature (CCT) of at least the first frame; determining the second characteristic of at least the second frame includes determining a second CCT of at least the second frame; and determining that the difference between the first characteristic and the second characteristic is greater than the threshold difference includes determining that a difference between the first CCT and the second CCT is greater than a CCT threshold.

Aspect 62. The method of any one of aspects 54 to 61, wherein: determining the first characteristic of at least the first frame includes determining a first histogram of at least the first frame; determining the second characteristic of at least the second frame includes determining a second histogram of at least the second frame; and determining that the difference between the first characteristic and the second characteristic is greater than the threshold difference includes determining that a difference between the first histogram and the second histogram is greater than a histogram history threshold.

Aspect 63. The method of any one of aspects 54 to 62, wherein determining the at least one smoothed histogram based on the determined scene cut includes: determining a plurality of smoothed histograms for the subset of frames based on a plurality of characteristics associated with the subset of frames; and determining the at least one smoothed histogram as a weighted sum of the plurality of smoothed histograms.

Aspect 64. The method of any one of aspects 54 to 63, wherein the first frame of the plurality of frames is a frame currently being encoded.

Aspect 65. The method of any one of aspects 54 to 64, further comprising: storing the plurality of frames in a buffer.

Aspect 66. The method of aspect 54, further comprising: generating dynamic metadata including the at least one smoothed histogram.

Aspect 67. The method of any one of aspects 54 to 66, further comprising: sending the dynamic metadata to a video encoder.

Aspect 68. A non-transitory computer-readable medium having stored thereon instructions that, when executed by one or more processors, cause the one or more processors to perform the operations of any one of aspects 38 to 67.

Aspect 69. An apparatus for determining one or more environmental layouts, comprising means for performing the operations of any one of aspects 38 to 67.

Aspect 70. An apparatus comprising at least one memory and at least process coupled to the at least memory and configured to perform the operations of any one of aspects 1 to 35 or 38 to 67.

Aspect 71. A method including operations according to any one of aspects 1 to 35 or 38 to 67.

Aspect 72. A non-transitory computer-readable medium having stored thereon instructions that, when executed by one or more processors, cause the one or more processors to perform the operations of any one of aspects 1 to 35 or 38 to 67.

Aspect 73. An apparatus for determining one or more environmental layouts, comprising means for performing the operations of any one of aspects 1 to 35 or 38 to 67.

What is claimed is:

1. An apparatus for processing video data, comprising:
- at least one memory; and
- at least one processor coupled to the at least one memory, the at least one processor configured to:
  - determine a first characteristic of at least a first frame of a plurality of frames and a second characteristic of at least a second frame of the plurality of frames;
  - determine whether a difference between the first characteristic and the second characteristic is greater than a threshold difference;
  - determine a scene cut in the plurality of frames based a determination that the difference between the first characteristic and the second characteristic is greater than the threshold difference, wherein the scene cut comprises a subset of frames of the plurality of frames, the subset of frames bounded by a beginning stop point and an ending stop point identified based on the difference between the first characteristic and the second characteristic; and
  - determine at least one smoothed histogram using the subset of frames of the plurality of frames.

2. The apparatus of claim 1, wherein the at least one processor is configured to:
- starting from a current frame of the plurality of frames, search in a first direction until it is determined that a difference between the first characteristic of the first frame and the second characteristic of the second frame is greater than the threshold difference;
- determining the first frame as a beginning of the determined scene cut;
- starting from the current frame of the plurality of frames, search in a second direction until it is determined that a difference between a third characteristic of a third frame and a fourth characteristic of a fourth frame is greater than the threshold difference; and
- determining the third frame as an end of the determined scene cut.

3. The apparatus of claim 2, wherein the subset of frames includes frames of the plurality of frames between the first frame and the third frame.

4. The apparatus of claim 1, wherein the first characteristic includes a first lux index of at least the first frame and the second characteristic include a second lux index of at least the second frame.

5. The apparatus of claim 1, wherein the first characteristic includes a first correlated color temperature (CCT) of at least the first frame and the second characteristic include a second CCT of at least the second frame.

6. The apparatus of claim 1, wherein the first characteristic includes a first histogram of at least the first frame and the second characteristic include a second histogram of at least the second frame.

7. The apparatus of claim 1, wherein:
- to determine the first characteristic of at least the first frame, the at least one processor is configured to determine a first lux index of at least the first frame;
- to determine the second characteristic of at least the second frame, the at least one processor is configured to determine a second lux index of at least the second frame; and
- to determine that the difference between the first characteristic and the second characteristic is greater than the threshold difference, the at least one processor is configured to determine that a difference between the first lux index and the second lux index is greater than a lux index threshold.

8. The apparatus of claim 1, wherein:

to determine the first characteristic of at least the first frame, the at least one processor is configured to determine a first correlated color temperature (CCT) of at least the first frame;

to determine the second characteristic of at least the second frame, the at least one processor is configured to determine a second CCT of at least the second frame; and to determine that the difference between the first characteristic and the second characteristic is greater than the threshold difference, the at least one processor is configured to determine that a difference between the first CCT and the second CCT is greater than a CCT threshold.

9. The apparatus of claim 1, wherein:

to determine the first characteristic of at least the first frame, the at least one processor is configured to determine a first histogram of at least the first frame;

to determine the second characteristic of at least the second frame, the at least one processor is configured to determine a second histogram of at least the second frame; and to determine that the difference between the first characteristic and the second characteristic is greater than the threshold difference, the at least one processor is configured to determine that a difference between the first histogram and the second histogram is greater than a histogram history threshold.

10. The apparatus of claim 1, wherein, to determine the at least one smoothed histogram based on the determined scene cut, the at least one processor is configured to:

determine a plurality of smoothed histograms for the subset of frames based on a plurality of characteristics associated with the subset of frames; and determine the at least one smoothed histogram as a weighted sum of the plurality of smoothed histograms.

11. The apparatus of claim 1, wherein the first frame of the plurality of frames is a frame currently being encoded.

12. The apparatus of claim 1, wherein the at least one processor is further configured to:

store the plurality of frames in a buffer.

13. The apparatus of claim 1, wherein the at least one processor is further configured to:

generate dynamic metadata including the at least one smoothed histogram.

14. The apparatus of claim 13, wherein the at least one processor is further configured to:

send the dynamic metadata to a video encoder.

15. The apparatus of claim 1, wherein the apparatus comprises a mobile device.

16. The apparatus of claim 1, further comprising at least one of a display and a camera configured to capture one or more frames.

17. A method of processing video data, comprising:

determining a first characteristic of at least a first frame of a plurality of frames and a second characteristic of at least a second frame of the plurality of frames;

determining whether a difference between the first characteristic and the second characteristic is greater than a threshold difference;

determining a scene cut in the plurality of frames based a determination that the difference between the first characteristic and the second characteristic is greater than the threshold difference, wherein the scene cut comprises a subset of frames of the plurality of frames, the subset of frames bounded by a beginning stop point and an ending stop point identified based on the difference between the first characteristic and the second characteristic; and determining at least one smoothed histogram using the subset of frames of the plurality of frames.

18. The method of claim 17, further comprising:

starting from a current frame of the plurality of frames, searching in a first direction until it is determined that a difference between the first characteristic of the first frame and the second characteristic of the second frame is greater than the threshold difference;

determining the first frame as a beginning of the determined scene cut;

starting from the current frame of the plurality of frames, searching in a second direction until it is determined that a difference between a third characteristic of a third frame and a fourth characteristic of a fourth frame is greater than the threshold difference; and determining the third frame as an end of the determined scene cut.

19. The method of claim 18, wherein the subset of frames includes frames of the plurality of frames between the first frame and the third frame.

20. The method of claim 17, wherein the first characteristic includes a first lux index of at least the first frame and the second characteristic include a second lux index of at least the second frame.

21. The method of claim 17, wherein the first characteristic includes a first correlated color temperature (CCT) of at least the first frame and the second characteristic include a second CCT of at least the second frame.

22. The method of claim 17, wherein the first characteristic includes a first histogram of at least the first frame and the second characteristic include a second histogram of at least the second frame.

23. The method of claim 17, wherein:

determining the first characteristic of at least the first frame includes determining a first lux index of at least the first frame;

determining the second characteristic of at least the second frame includes determining a second lux index of at least the second frame; and determining that the difference between the first characteristic and the second characteristic is greater than the threshold difference includes determining that a difference between the first lux index and the second lux index is greater than a lux index threshold.

24. The method of claim 17, wherein:

determining the first characteristic of at least the first frame includes determining a first correlated color temperature (CCT) of at least the first frame;

determining the second characteristic of at least the second frame includes determining a second CCT of at least the second frame; and determining that the difference between the first characteristic and the second characteristic is greater than the threshold difference includes determining that a difference between the first CCT and the second CCT is greater than a CCT threshold.

25. The method of claim 17, wherein:

determining the first characteristic of at least the first frame includes determining a first histogram of at least the first frame;

determining the second characteristic of at least the second frame includes determining a second histogram of at least the second frame; and determining that the difference between the first characteristic and the second characteristic is greater than the threshold difference includes determining that a difference between the first histogram and the second histogram is greater than a histogram history threshold.

26. The method of claim 17, wherein determining the at least one smoothed histogram based on the determined scene cut includes:

determining a plurality of smoothed histograms for the subset of frames based on a plurality of characteristics associated with the subset of frames; and determining the at least one smoothed histogram as a weighted sum of the plurality of smoothed histograms.

27. The method of claim 17, wherein the first frame of the plurality of frames is a frame currently being encoded.

28. The method of claim 17, further comprising:

storing the plurality of frames in a buffer.

29. The method of claim 17, further comprising:

generating dynamic metadata including the at least one smoothed histogram.

30. The method of claim 29, further comprising:

sending the dynamic metadata to a video encoder.

* * * * *